(12) United States Patent
Dageville et al.

(10) Patent No.: US 11,709,808 B1
(45) Date of Patent: Jul. 25, 2023

(54) SCHEMA EVOLUTION FOR THE SERIALIZATION OF NON-PRIMARY KEY COLUMNAR DATA INTO ROW-ORGANIZED BYTE SEQUENCES

(71) Applicant: Snowflake Inc., Bozeman, MT (US)

(72) Inventors: Benoit Dageville, San Mateo, CA (US); Adrian Hamza, Sammamish, WA (US); William Waddington, Stateline, NV (US); Khaled Yagoub, Fremont, CA (US); Wumengjian Zhu, Cupertino, CA (US); Lishi Jiang, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/656,558

(22) Filed: Mar. 25, 2022

(51) Int. Cl.
*G06F 16/21* (2019.01)
*G06F 16/22* (2019.01)

(52) U.S. Cl.
CPC .......... *G06F 16/213* (2019.01); *G06F 16/221* (2019.01)

(58) Field of Classification Search
CPC .. G06F 16/213; G06F 16/221; G06F 16/2329; G06F 16/2255
See application file for complete search history.

(56) References Cited

U.S. PATENT DOCUMENTS

| | | | | |
|---|---|---|---|---|
| 8,214,353 | B2 * | 7/2012 | Inturi | G06F 16/256 707/715 |
| 10,990,571 | B1 * | 4/2021 | Zhang | G06F 16/2379 |
| 11,138,164 | B1 * | 10/2021 | Munuhur Rajagopal | G06F 16/213 |
| 2006/0294474 | A1 * | 12/2006 | Taylor | G06F 16/38 715/825 |
| 2007/0050395 | A1 * | 3/2007 | Hunter | H04L 9/0866 707/999.102 |
| 2012/0023143 | A1 * | 1/2012 | Bolohan | G06F 16/213 707/E17.005 |
| 2015/0229613 | A1 * | 8/2015 | Baum | G06F 9/4488 713/171 |
| 2021/0191903 | A1 * | 6/2021 | Shetty | G06F 16/213 |
| 2022/0004664 | A1 * | 1/2022 | Burgupalli | G06F 21/6218 |

* cited by examiner

*Primary Examiner* — Vaishali Shah
*Assistant Examiner* — Lana Alagic
(74) *Attorney, Agent, or Firm* — Schwegman Lundberg & Woessner, P.A.

(57) ABSTRACT

The subject technology receives a statement to perform an operation to add a new column into a table. The subject technology generates a schema hash value for a new schema version associated with a new schema version value. The subject technology stores a mapping of the schema hash value to the new schema version value for the table in a metadata database. The subject technology stores a new schema entry based on the schema hash value, the new schema version value, and the new column for the table in the metadata database. The subject technology performs an operation to add the new column to the table.

24 Claims, 13 Drawing Sheets

SCHEMA EVOLUTION FOR THE SERIALIZATION OF NON-PRIMARY KEY COLUMNAR DATA INTO ROW-ORGANIZED BYTE SEQUENCES

TECHNICAL FIELD

Embodiments of the disclosure relate generally to a network-based database system or a cloud data platform and, more specifically, to processing concurrent transactions to enable transactional processing in a safe and performant manner (e.g., avoiding deadlock and starvation) within the database system.

BACKGROUND

Cloud-based data warehouses and other database systems or data platforms sometimes provide support for transactional processing that enable such systems to perform operations that are not available through the built-in, system-defined functions. However, for mitigating security risks, security mechanisms to ensure that user code running on such systems remain isolated are needed.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
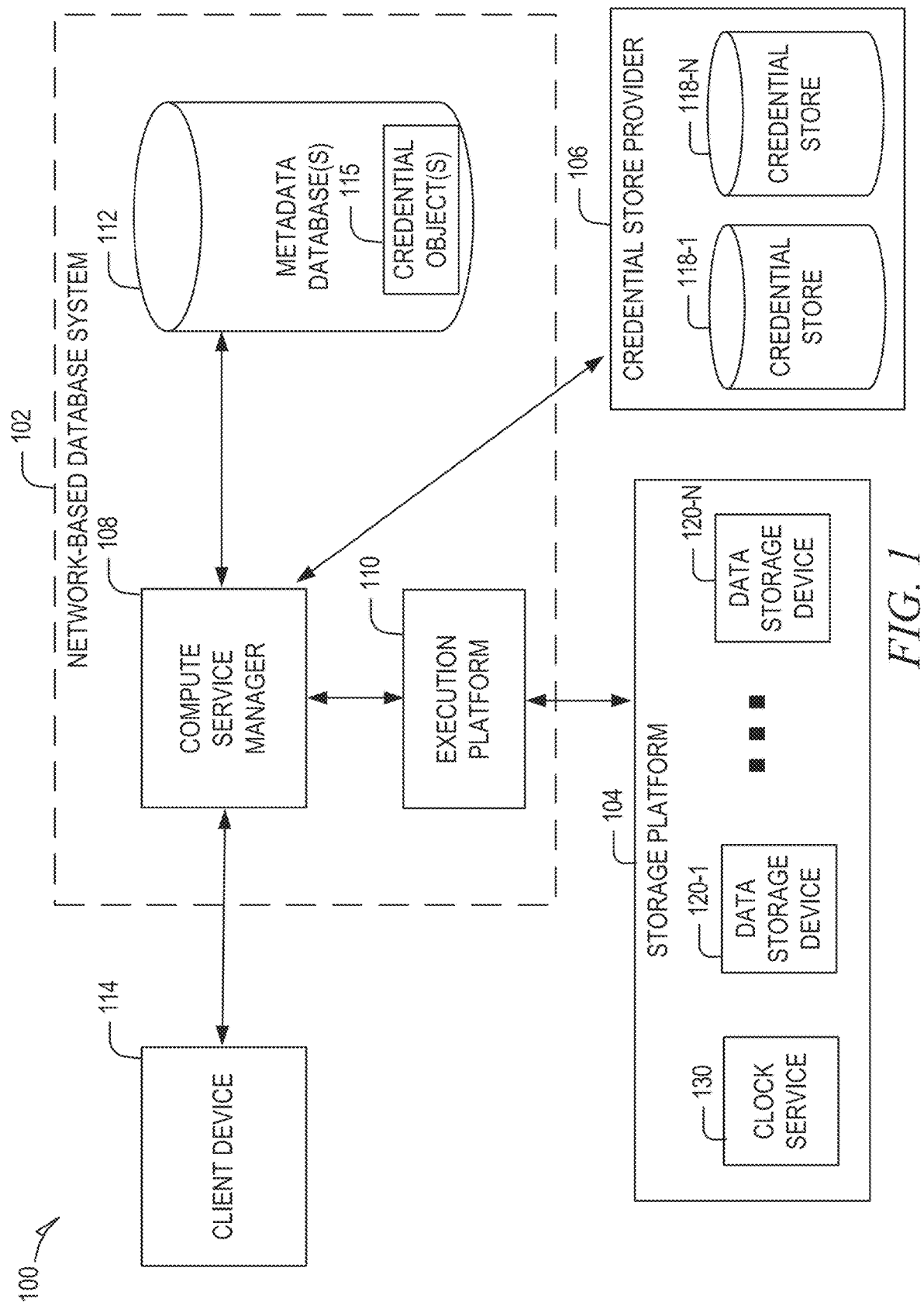
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In database systems, performing transactions on a given database can be supported. To facilitate that a given transaction is committed to a table, existing database systems can employ varying approaches including Online Transactional Processing (OLTP) techniques. As discussed herein, OLTP refers to a category of data processing that involves transaction-oriented tasks. In an example, OLTP involves inserting, updating, and/or deleting varying amounts of data in a given database. OLTP can deal with large numbers of transactions by a large number of users. Increasingly, such transactions occur within and users are working in a distributed and networked environment from varying locations and computing environments. Thus, it is also increasingly important to ensure such transactions execute and complete in a concurrent manner that protects the integrity and consistency of the data in such a distributed environment.

As described herein, the subject technology provides concurrency control and isolation for executing a series of query statements (e.g., SQL statements) within a transaction against a linearizable storage. In particular, the subject technology employs a concurrency control mechanism that is a combination of a multi-version concurrency control for read operations (MVCC) and locking for write operations. Additionally, the subject technology implements a targeted isolation level (e.g., snapshot isolation), where each statement can execute against a different snapshot of a database, and write locks are held until a transaction commit.

The subject technology, in an embodiment, implements a two-level transaction hierarchy, where a top-level transaction corresponds to a SQL transaction, and a nested transaction corresponds to a SQL statement within the parent SQL transaction. A given nested transaction can perform read and write operations, and can perform a rollback and restart execution zero or more times before succeeding. Upon transaction commit, write operations can become visible, and write locks held by each contained statement can be released.

Further, embodiments of the subject technology address deadlock detection and resolution for databases. Advantageously, the subject technology avoids false positives where only transactions involved in a deadlock will be aborted. This is helpful for users to find deadlocks in their application code so that deadlocks can be fixed. In addition, the subject technology implements embodiments of distributed deadlock detection without a centralized transaction manager. In an example, this is desirable for distributed databases, where each transaction is executed by a separate job, so that the coordination among different jobs/nodes are minimized.

Moreover, embodiments of the subject technology facilitate supporting schema evolution in a distributed database environment, where multiple versions of a database schema can be utilized, in a transparent and efficient manner, in a given table(s) of a database system thereby providing improvements to the functionality of a computer(s) (e.g., hardware or software components running the database system) by at least reducing utilization of computing resources (e.g., processor, memory, storage, and the like) in the database system described herein.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

As further shown, the storage platform 104 includes clock service 130 which can be contacted to fetch a number that will be greater than any number previously returned, such as one that correlates to the current time. Clock service 130 is discussed further herein below with respect to embodiments of the subject system.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks.

These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
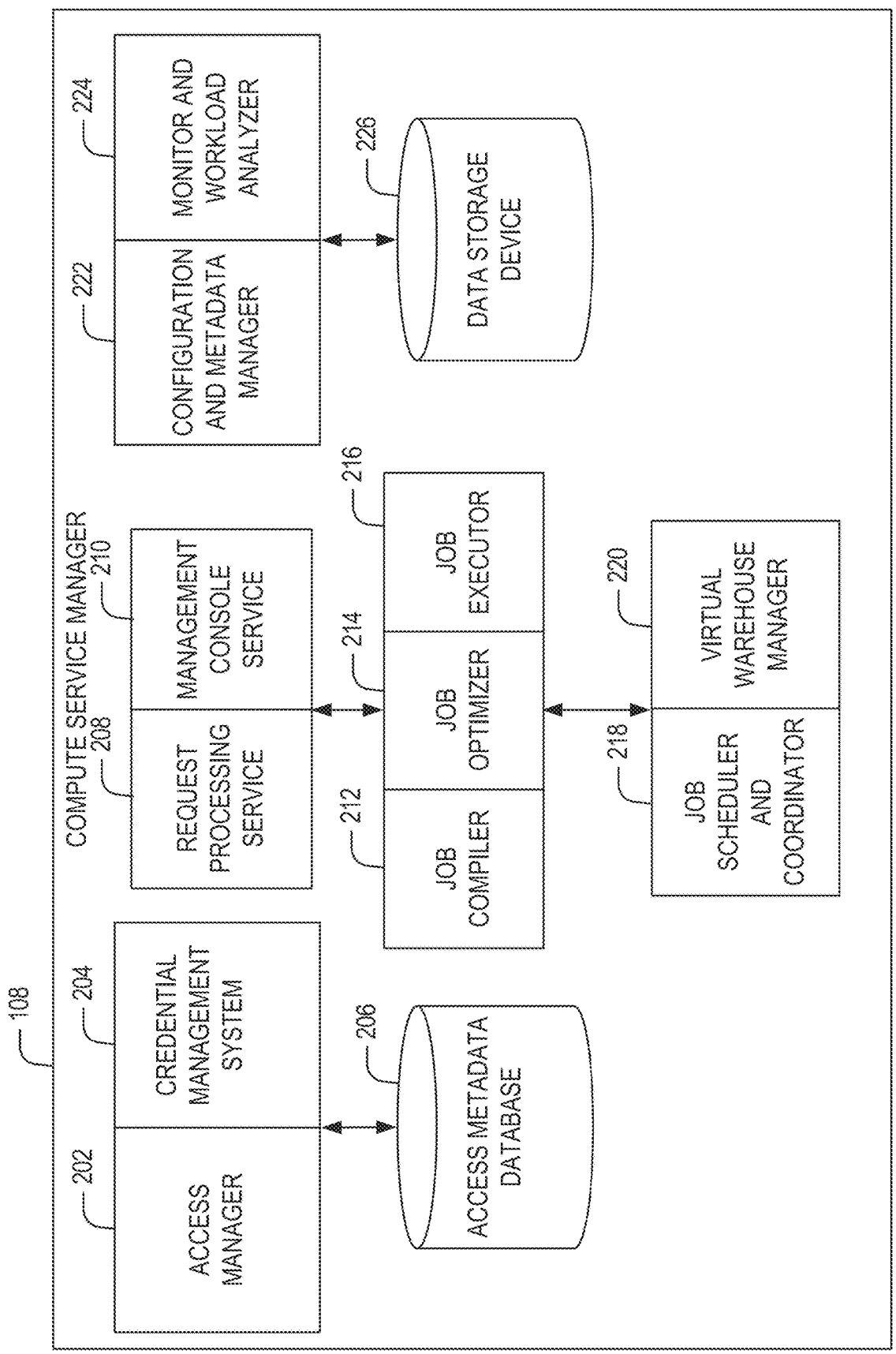
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104) but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
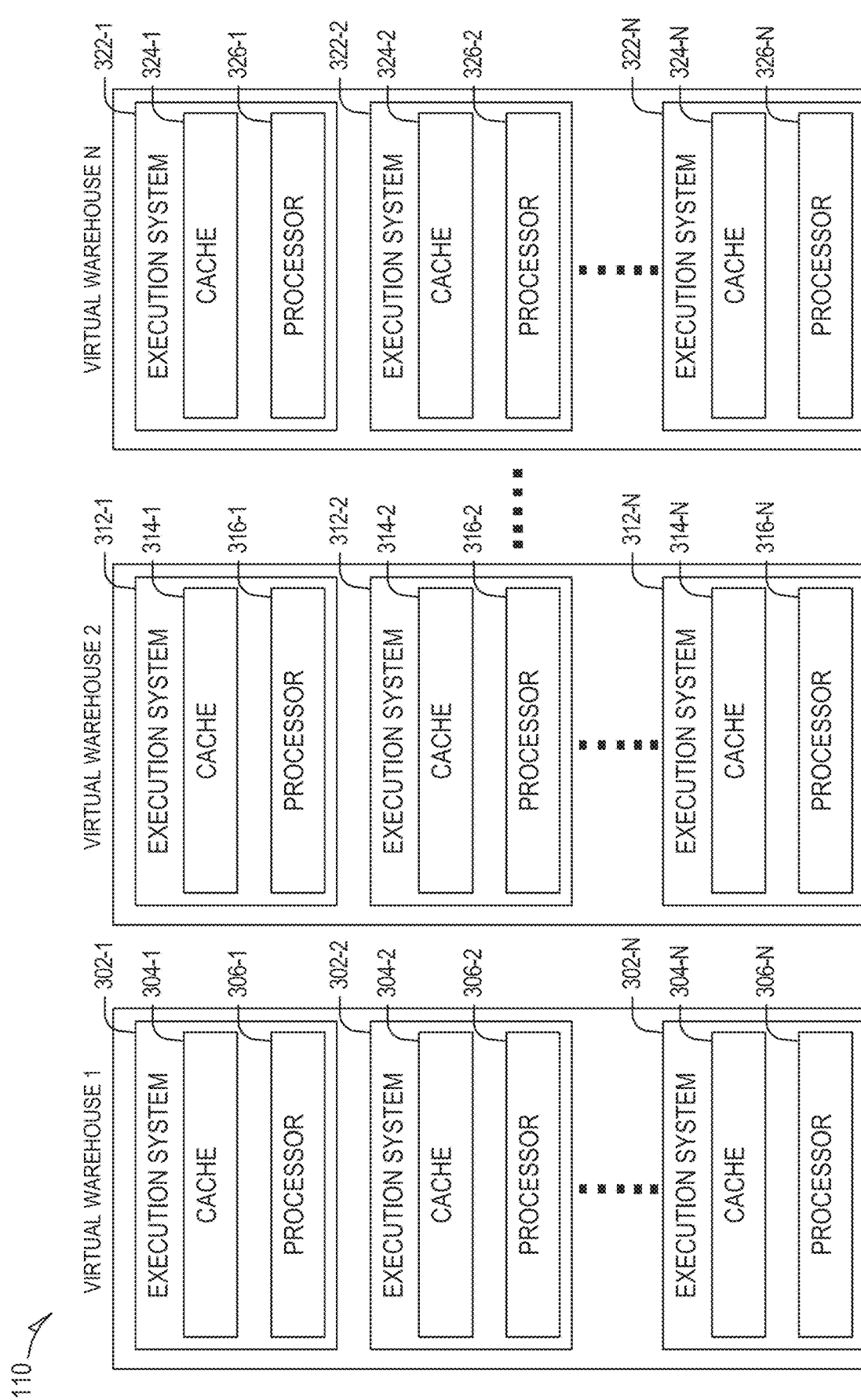
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
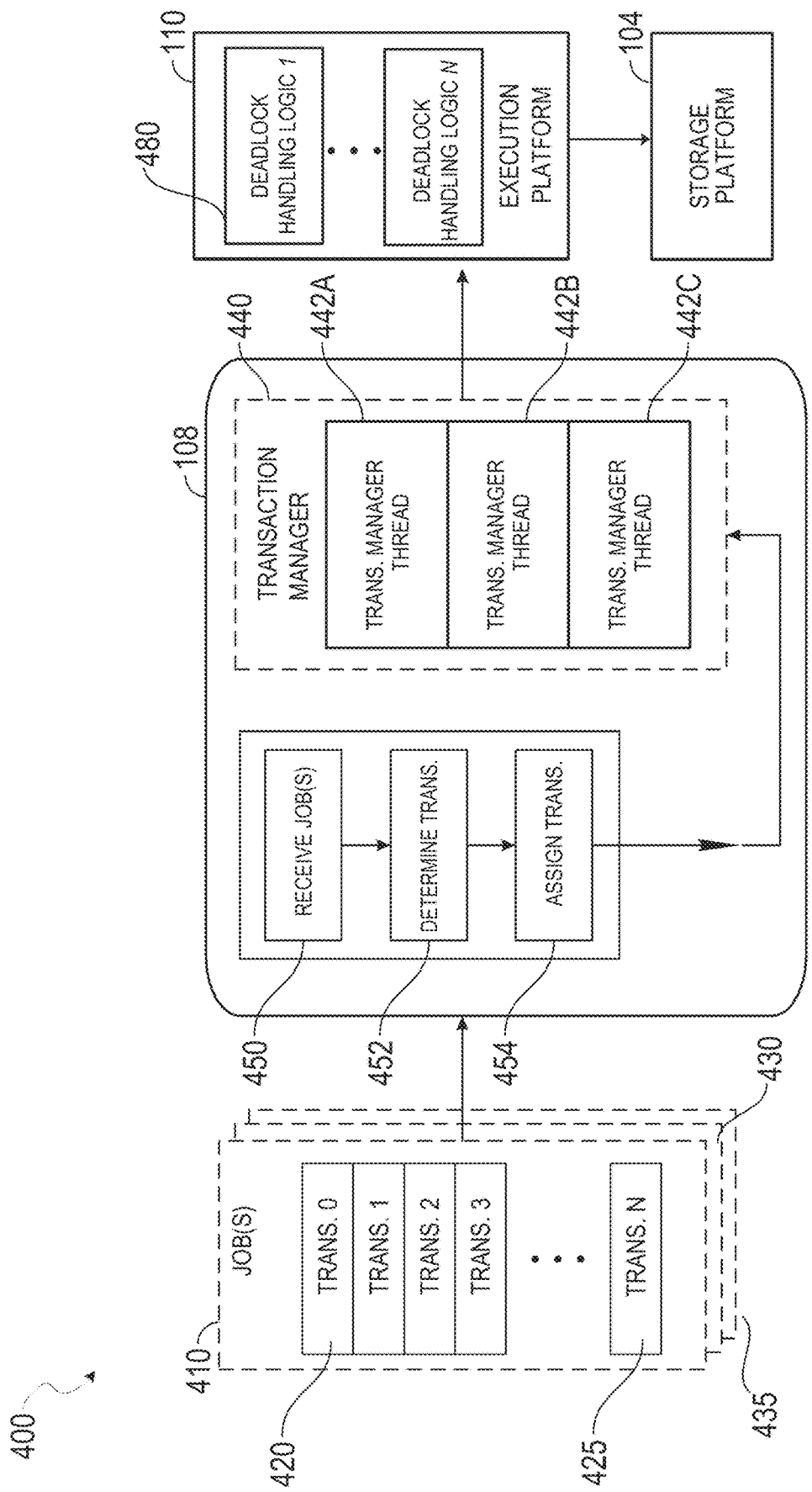
FIG. 4 is a computing environment conceptually illustrating an example software architecture for managing and executing concurrent transactions on a database system, which can be performed by a given execution node of the execution platform, in accordance with some embodiments of the present disclosure.

FIG. 4 is a computing environment 400 conceptually illustrating an example software architecture for managing and executing concurrent transactions on a database system (e.g., the network-based database system 102), which can be performed by a given execution node of the execution platform 110, in accordance with some embodiments of the present disclosure. In an embodiment, a process flow is performed by a transaction manager that is configured to manage and execute transactions as described further herein.

As shown, the transaction manager 440 is included in the compute service manager 108. The transaction manager 440 receives a job 410 that may be divided into one or more discrete transactions 420-425, e.g., transaction 0, transaction 1, transaction 2, transaction 3, and so forth through transaction (n). In an embodiment, each transaction includes one or more tasks or operations (e.g., read operation, write operation, database statement, user defined function, and the like) to perform. The transaction manager 440 receives the job at 450 and determines transactions at 452 that may be carried out to execute the job 410. The transaction manager 440 is configured to determine the one or more discrete transactions, such as transaction 0, transaction 1, transaction 2, transaction 3, and so forth, based on applicable rules and/or parameters. The transaction manager 440 assigns transactions at 454.

As further shown, the transaction manager 440 is configured to concurrently process multiple jobs that can be performed by the execution platform 110. In an example, the transaction manager 440 can receive a second job 430 or a third job 435, each of which include respective discrete transactions that are to be performed on the execution platform 110. Each of the transactions may be executed concurrently by the execution platform 110 in which different operations are performed (e.g., a respective read operation or write operation are executed from each of the transactions by the execution platform 110).

In an implementation, the job 410, including the respective transactions therein, is carried out by the transaction manager 440 which can perform the responsibilities of a query manager (e.g., processing query statements and operations, and the like). As shown, the transaction manager 440 may have multiple threads, including, for example, transaction manager threads 442A, 442B, 442C, and so forth. The transaction manager 440 may assign the job 410, including the multiple discrete transactions, to a particular virtual warehouse of the execution platform 110. Based on this assignment, the transaction manager 440 can send the job 410, including the multiple discrete transactions, to the assigned virtual warehouse for execution. Alternatively, the transaction manager 440 can send a subset of the transactions included in the job 410 for execution by the execution platform 110.

In an embodiment, as described further herein, the transaction manager 440 can perform operations to process transactions (e.g., OLTP) that may be executing concurrently, while handling conflicts and avoiding starvation of resources. Further, as described further herein, the transaction manager 440 handles conflicts between multiple transactions and concurrency issues that can arise when multiple transactions are executing in parallel on the execution platform 110. As further shown, the execution platform 110 communicates with the storage platform 104, which provides a distributed database (e.g., FoundationDB, and the like), where data can be read and written in connection with performing the transactions.

In an embodiment, the transaction manager 440 schedules and manages the execution of transactions on behalf of a client account. The transaction manager 440 may schedule any arbitrary SQL query included in a given transaction. The transaction manager 440 may assume a role to schedule the job 410 as if it is the client account rather than as an internal account or other special account. The transaction manager 440 may embody the role of, for example, an account administrator or a role having the (smallest) scope necessary to complete the job 410. In an embodiment, the transaction manager 440 embodies the role that owns the object that is the target of the job 410 (e.g. for a cluster, the table being clustered is the target).

In an embodiment, the transaction manager 440 determines transactions at 452 and assigns transactions at 454 that must be performed to fully execute the job 410. In an embodiment, the transaction manager 440 assigns ordering constraints to any number of the one or more discrete transactions, where applicable. Depending on the constraints of the job 410, the transaction manager 440 may determine that one or more of multiple discrete transactions must be serialized and executed in a particular order.

In an embodiment, the transaction manager 440 generates a report indicating when the job 410 is scheduled to be executed and how much computing resources are estimated to be tied up executing the job 410. The transaction manager 440 may alert a client account when the job 410 is being executed.

The subject technology provides concurrency control and isolation for executing transactions against (e.g., a series of SQL Statements within a SQL Transaction) against linearizable storage (e.g., a linearizable key-value store). A transaction as referred to herein includes a group of operations executed atomically. In an example, such transactions may include read and write operations but can also include operations such as increment, decrement, compare-and-swap, and the like. Further, it is appreciated that linearizable storage may include any type of distributed database (e.g., Apache HBase).

The following discussion relates to transactions in a given distributed database system. In an example, the transaction manager 440 utilizes a linearizable storage, provided by the storage platform 104, for managing and processing transactions as described herein. In an embodiment, the transaction manager 440 implements a read committed model for performing transactions. As referred to herein, a read committed model can refer to a model that ensures that all read operations performed in a given transaction sees a consistent snapshot of the database (e.g., reading a last set of committed values that existed when the read operation commenced), and the transaction itself successfully commits only if no updates that the transaction has made results in write-write conflicts with any concurrent transactions.

As discussed further herein, the transaction manager 440 implements a two-level transaction hierarchy, where a top-level transaction corresponds to a SQL transaction, and a nested transaction corresponds to a SQL statement within the parent SQL transaction. A given nested transaction can perform operations, such as reads and writes, and can perform a rollback and restart execution zero or more times before succeeding. Upon transaction commit, write operations can become visible, and write locks held by each contained statement can be released.

As mentioned before, the subject system provides concurrency control and isolation for executing a series of SQL Statements within a SQL Transaction against a linearizable storage. As discussed further herein, a transaction manager (e.g., transaction manager 440) is configured to provide a concurrency control mechanism that can be understood as a combination of multi-version concurrency control for read operations (MVCC) and locking for write operations. The subject system provides techniques for read committed isolation where each statement may execute against a different snapshot of the database (e.g., the storage platform 104), with write locks held until transaction commit.

In an embodiment, the linearizable storage as described herein enables each operation to execute atomically between invocation and response. As an example, such a linearizable key-value store ensures that operations execute in an atomic manner consistent with a "real-time" ordering of those operations e.g., when operation A completes before operation B begins, operation B should take effect after operation A. In the context of a database, a first write operation to a row in the table must take effect before a second write or read operation to the same row in the table if the second operation was issued after the first completed.

The examples described herein relate to linearizable storage such as a linearizable database, including, for example, NoSQL systems, and the like. A given NoSQL database refers to a database that stores data in a format other than a tabular format, and can store data differently than in relational tables. Further, Uber's Schemaless is an example of building linearizable Key-Value storage via having a "key" and "value" column in a relational table. Other examples of linearizable databases are: HBase, RocksDB, TiKV, Redis, Etcd.

Some examples of optimizations provided by the subject system include utilizing restricted transactional capabilities offered by some embodiments of storage platform 104, such as FoundationDB, that can be leveraged to enable a more efficient transaction implementation. For example, in a write (/lock/delete) protocol, a write operation is performed, and then a read operation is done to check for (1) any write operation that happened before the write request was submitted (2) any other write operation was submitted concurrently with the write operation that was serialized before. The following example illustrates the above:

T1 starts statement S1
    S1 starts a FoundationDB Transaction, and uses its Read Version as the Read Timestamp
    S1 wishes to write object X, so it first reads object X as of the Read Timestamp
    Finding no conflicts, S1 writes X, using a timestamped operation to embed the commit timestamp in the key and setting IsCommitEmbedded.
    S1 sets a read conflict range on the FoundationDB transaction for all keys with a prefix of X S1 writes a transaction status entry for ID, directly setting it to committed.

T1 commits the FoundationDB Transaction.

If the transaction commits, then there were no concurrent conflicting transactions.

If the transaction is aborted, then there was a concurrency conflicting transaction for one of the writes that were done. None of S1's writes, nor the transaction status entry will be persisted. S1 must now restart in the slow path.

In an example, a "read version" refers to a "version" or state of the database that corresponds to when a last operation was successfully committed to the database.

The following relates to a discussion of strict serializability. Whereas linearizability makes a "real-time" ordering and atomicity promise about single operations, strict serializability makes a "real-time" ordering and atomicity promise about groups of operations. In an example, the group of operations is submitted incrementally over time, with a terminal "commit" command being issued. The strictly serializable storage platform may employ techniques such as pessimistic lock-based exclusion or an optimistic validation phase to enable this functionality. In this example, the group of operations is referred to as a transaction as mentioned herein. The subject system can impose restrictions on the transaction, such as the number, size, or duration of the operations, and always reject transactions that exceed these limits.

In an embodiment, read operations may be optimized in the following manner. When reading with a given read timestamp, it may not be feasible for any transaction started after the read timestamp to commit before the read timestamp. Thus, if the Transaction ID is set to be the same as the first statement's read timestamp, then instead of reading [X.0, X.inf], the subject system can read [X.0, X.readTimestamp]. Consequently, this approach can make read operations for old or frequently written data more efficient.

In an embodiment, the subject system implements a two-level transaction hierarchy, where the top-level transaction corresponds to a SQL Transaction, and the nested transaction (referred to as a "StatementContext") corresponds to a SQL statement within the parent SQL Transaction. A given StatementContext performs read and write operations and may be instructed to perform a rollback and restart execution zero or more times before succeeding. In an example, transactions control the collective visibility of all write operations from successful statements. Upon transaction commit, all write operations become visible, and all write locks held by each contained statement are released.

In an embodiment, each object key is associated with a stamp that uniquely identifies a single execution attempt of a statement, which can be by appending a three-part tuple of (Transaction ID, statementNumber, restartCount). The higher order component is the transaction identifier assigned to the SQL-level transaction. The statementNumber identifies the SQL statement within the SQL-level BEGIN/COMMIT block. The restart count tracks which statement restart attempt generated this write operations. A StatementContext is instantiated with this stamp, and applies it to all writes performed through the StatementContext instance.

Stamping keys this way has a number of desirable properties. First, if key1<key2, then key1.suffix1<key2.suffix2, regardless of the values of suffix1 and suffix2. If key1==key2, then the transactionID component of the suffix allows us to resolve the commit status of the object to determine its visibility to the statement. If transactionID1=transactionID2, then Statement Number allows statements to see writes performed by previous statements within the same transaction. The restartCount component of the suffix enables the system to detect and delete obsolete versions of the object that had been left around when a statement has to be restarted.

In a similar fashion each execution of a statement is given a three-part identifier consisting of the statement's read-Timestamp (RTS) and the current values of statementNumber (SN) and restartCount (RC). This approach ensures that each statement that is part of the execution of a SQL statement (or more generally a SQL Transaction), sees either data committed before the SQL statement started or by data written or updated by the transaction itself.

In an embodiment, the transaction manager employs a Transaction Status Table (TST) to keep track of committed and aborted transactions. The TST is a persistent hashmap that maps Transaction ID to its metadata, most notably a list of finalized statement numbers and their final restart count, and the commit outcome including the transaction's commit timestamp (CTS). Transactions that are in progress do not exist in the Transaction Status Table. In an embodiment, the TST can be stored in the storage platform 104, or within memory or cache of the execution platform 110.

The following discussion relates to a read protocol that is utilized by the transaction manager 440.

In an embodiment, the transaction manager 440 uses a read committed transaction isolation level, and each statement may be run with a different read timestamp. In an example, the read request for a given key (or a range of keys) is implemented by executing a linearizable storage read call for all keys with X as their prefix. The call returns versions of X with their stamps and values. The read method returns either the latest version of X made by a transaction that committed before the SQL statement started or which was written by the most recent statement of the transaction itself that was not canceled (if any).

The following discussion relates to a write protocol that is utilized by the transaction manager 440.

In an embodiment, the write protocol checks both for WW (write-write) conflicts and WW deadlocks. The following example describes a single transaction and no conflicts. Assume that object X initially has a stamp of TXN1.0.0 and was committed at timestamp 10. In the following example, it should be understood that the following transactional steps described further below can be done within one transaction, and collectively committed. On failure, or upon exceeding the limitations of the underlying transactional system, the execution can fall back to issuing the operations individually as described in further detail below.

T2 starts and creates S1 of StatementContext(ID=TXN2, Statement Number=1, restartCount=0)

Assume that the constructor obtains a read timestamp from the linearizable storage of 15 by contacting the clock service 130. As mentioned before, the clock service 130 is a component of the storage platform 104 which can be contacted to fetch a number that will be greater than any number previously returned, such as one that correlates to the current time. In an embodiment, clock service 130 is provided separately and is independently contactable from the linearizable storage, or can be integrated into the linearizable storage such that the clock value may be inserted into a written value. The latter operation will be referred to as a timestamped write.

To update value of X, the following sequence of actions is performed in an embodiment:
{
   S1 does a linearizable storage write for X.TXN2.1.0 with a value of 100
   // The next step is for S1 to check for WW (write-write) conflicts by checking whether there is
   // another transaction that has updated X between the RTS and S1's write.
   S1 issues the range read [X.0, X.inf] to obtain the set all versions of X and their stamps
   The read returns [X.TXN1.0.0, X.TXN2.1.0].
   S1 looks up TXN1 in the Transaction Status Table, finds a commit timestamp of 10.
   10 is earlier than our read timestamp of 15, so it is not a conflict.
   S1 ignores [X.TXN2.1.0] as it belongs to S1
   // Assume for now, there were no conflicts detected
   S1 finalizes, and records (statement number=1, restart count=0) into the transaction status table for TXN2
}
T2 commits. This will cause the Transaction Status Table record to be updated in linearizable storage to reflect that TXN2 is now committed and its commit timestamp of 20.

At this point there will be two versions of X, one stamped with TXN1.0.0 and the other TXN2.1.0. Subsequent transactions that read X can determine if this new version of X was written by a committed transaction by reading the transaction status record, and determine the CTS of the transaction.

The write protocol for transaction T can now be stated.

In an implementation, each row (object) updated requires two separate linearizable storage transactions:

1) The first linearizable storage transaction of T inserts a new version of the object with its key X suffixed with three-part suffix (T.ID, T.statementNumber, T.restartCount).

2) The second linearizable storage transaction issues a range read with the prefix "X." to obtain the SCT (set of conflicting transactions). The result set is a list of committed or active transactions that wrote (or are writing) new versions of X.

There are a number of possible distinct outcomes to this linearizable storage read call that are evaluated in the following order:

1) SCT is empty in which case T is trivially allowed to proceed.

2) SCT is not empty, but for all Ti in SCT, Ti has committed before T's read timestamp, and thus are not WW (write-write) conflicts. T may proceed.

3) SCT is not empty; for all Ti in SCT, Ti is committed; and there exists a Ti in SCT, such that its CTN is greater than T's read timestamp. T is permitted to restart without delay.

4) SCT is not empty, and for one or more Ti in SCT, Ti has not yet committed or aborted. T must wait for all transactions in SCT to complete before restarting the current statement.

5) SCT is not empty, and for one or more Ti in SCT, Ti.TransactionID is the same as our own transaction ID, and Ti.StatementCount is less than our current statement count. This means that currently the lock is held, as a previous statement took it and successfully finished its execution. T may proceed.

6) SCT is not empty, and for one or more Ti in SCT, TI.TransactionID is the same as our own transaction ID, Ti.StatementCount is the same as our own StatementCount, and Ti.RestartCount is less than our own restart count. This is a lock from a previous execution of our own transaction, thus T holds the lock on this row, and T may proceed.

For all cases, the object (X.Stamp, Value) will be left in the database (e.g., the storage platform 104). For (3) and (4) which require restarts, the object is left to serve as a write lock. In general, all tentative writes for an object X will form a queue of write locks. (5) and (6) illustrate the cases where previously left write locks allow subsequent statements or restarts of a statement to recognize that they already hold the lock that they wish to take.

The following discussion describes an example that illustrates a write-write (WW) conflict. A write-write conflict, which is also understood as overwriting uncommitted data, refers to a computational anomaly associated with interleaved execution of transactions. To simplify the example, stamps are omitted. Assume that before either T1 or T2 starts that object X has a value of 500, a stamp of TXN1.0.0, and a CTN of 10.

T1 starts and gets a read timestamp of 15
T2 starts and gets a read timestamp of 20
T2 writes (key=X.T2, value=100)
T2 issues a linearizable storage read with range [X.0, X.Inf].
The set SCT will be empty so T2 continues
T1 writes (key=X.T1, value=50)
T1 issues a linearizable storage read with range [X.0, X.Inf].
The set SCT will contain T2 so T1 must restart
T2 successfully commits. T1's CTN for X will be >20. Assume it is 21
After waiting until T2 either commits or aborts, T1 restarts the statement with a read TS>21.

The following discussion relates to a delete protocol utilized by the transaction manager 440.

In an embodiment, delete operations are implemented as a write of a sentinel tombstone value; otherwise, delete operations employ the same protocol as write operations. When a read operation determines that the most recently committed key is a tombstone, it considers that key to be non-existent.

The following discussion relates to a lock protocol utilized by the transaction manager 440.

To support a query statement of SELECT . . . FOR UPDATE, the transaction manager API offers StatementContext::lock(Key), which allows rows to be locked without writing a value to them. The implementation of lock( ) follows the write protocol, except that it writes a special sentinel value to indicate the absence of a value (distinct from SQL NULL). A SELECT . . . FOR UPDATE statement may also be forced to restart several times before the statement finishes successfully. Once it does, subsequent statements in the transaction will recognize the existence of this key as an indication that they hold the lock (in accordance with cases (5) and (6) above). All reads can ignore the key as a write.

The following discussion relates to determining whether to commit, abort, or restart a given transaction which can be determined by the transaction manager 440.

When a transaction finishes its execution, it will either have an empty SCT, indicating that the commit can proceed, or an SCT with one or more conflicting transactions, indicating that the transaction will need to restart.

When a statement is restarted, all writes stamped with a lower restartCount are left in the database (e.g., the storage platform 104) as provisional write locks for the next execution. The next execution of the statement might write a different set of keys. The set difference between the first and second execution form a set of orphaned writes that must be removed and never become visible. The statement itself may not be relied upon to always be able to clean up its own orphaned writes, as in the event of a process crash, the location of the previous writes will have been forgotten. Finalizing statements and recording the restart count of the successful execution promises that only the results of one execution will ever become visible, and permits orphaned writes to be lazily cleaned up.

A transaction is committed, and all of its writes made visible, by inserting its Transaction ID into the Transaction Status Table. The commit timestamp is filled in by the clock service 130 or directly by the distributed database (e.g., FoundationDB), such that it is higher than any previously assigned read or commit timestamps. All writes must have completed before a statement may be finalized, and all statements must be finalized before the transaction may be committed.

A transaction is aborted by inserting its Transaction ID into the Transaction Status Table, with its transaction outcome set as aborted. The list of finalized statements and their restart counts will be reset to an empty list. The insertion into the Transaction Status Table will make the abort outcome visible to all conflicting transactions, and all writes performed by finalized statements may be proactively or lazily removed from the database (e.g., the storage platform 104).

When a statement tries to finalize with a non-empty SCT, it waits for commit outcomes to be persisted to the Transaction Status Table for all conflicting transactions. Once all conflicting transactions have committed or aborted, then the transaction will begin its restart attempt.

The following discussion relates to an API (e.g., the transaction manager API as referred to below) that can be utilized (e.g., by a given client device) to send commands and requests to the transaction manager 440.

A SQL transaction contains a sequence of one or more SQL statements. Each SQL statement is executed as a nested transaction, as implemented by the transaction manager StatementContext class. Each transaction manager statement itself is executed as one or more database transactions.

In an embodiment, the transaction manager API is divided into two parts: 1) the data layer, which provides a read and write API to the transaction execution processes; and 2) the transaction layer, which provides, to the compute service manager 108, an API to orchestrate the transaction lifecycle. In an implementation, transactions operate at a READ COMMITTED isolation level and implement MVCC on top of the distributed database (e.g., storage platform 104) to avoid taking any read locks.

Consider the following example SQL query:
Update emp.Salary=emp.Salary*1.1 where emp.Dept="shoe";

In an example, an instance of the StatementContext class will be created to execute this SQL statement. The constructor contacts the linearizable storage transaction manager to begin a linearizable storage transaction and obtain a linearizable storage STN which is then stored in the readTimestamp variable.

The Update operation then executes across any number of execution nodes, all using the same StatementContext instance. In an example, a function rangeRead( ) will be used to scan the base table, or an index on Dept, for the tuples to update. A series of write( ) calls will be made to update the salary of all matching employees.

A call to finalize( ) will return CONFLICT if the statement encountered any conflicts during its execution, to indicate that re-execution is needed. The key to restarts making progress is that the first execution of the statement will have the side effect of, in effect, setting write locks on the objects being updated. This ensures that when the statement is re-executed the necessary writes locks have already been obtained and the statement will generally (but not always).

Next, consider an example illustrating Write-Write conflicts between 3 transactions:
T1 starts S1 with timestamp 10
T2 starts S2 with timestamp 20
T3 starts S3 with timestamp 30
S1 writes X
S2 writes Y
S3 writes Z
S1 writes Y, and notes the conflict with T2
S2 writes Z, and notes the conflict with T3
S3 writes X, and notes the conflict with T1

In this case described above, three transactions are involved in a deadlock. Each statement believes that it must restart and wait for the execution of the previous transaction to finish. No transaction has the complete information to know that it is involved in a deadlock.

Thus, when a statement fails to finalize due to conflicts, it instead writes its conflict set into the database (e.g., the storage platform 104). These conflict sets may be read by all other transactions, allowing them to detect a cycle in the waits-for graph, indicating that they're involved in a deadlock.

In database systems, a deadlock can refer to a situation where two or more transactions are waiting for one another to give up locks. As an example, deadlocks can be handled by deadlock detection or prevention in some embodiments. The following discussion relates to example mechanisms for handling deadlocks utilizing distributed approaches that do not require a centralized deadlock handling component or implementation. For example, in an implementation, a particular execution node, (e.g., execution node 302-1 and the like) in the execution platform 110 can perform at least some of the following operations described below.

Deadlock detection: A basic idea of deadlock detection is to detect a deadlock after the deadlock occurs such that that a particular transaction can be aborted. This can be done by finding cycles in a wait-for graph. Depending on how deadlock detection is performed, deadlock detection can be classified as:
  Online detection: whenever a transaction wishes to acquire a lock, it adds an edge to the wait-for graph. The transaction is aborted if this new edge will cause a cycle.
  Offline detection: the system periodically collects the pending lock requests from all transactions to construct a wait-for graph and perform cycle detection.

Deadlock prevention: A basic idea of deadlock prevention is to enforce some restrictions on locking so that deadlocks can never happen. Example techniques include:
  Timeout: a transaction is assumed to be involved in a deadlock if its lock request cannot be granted after a certain time period, e.g., 5 seconds.
  Non-blocking 2PL: whenever a conflict happens, a transaction is aborted immediately.
  Wait-die: when a transaction Ti requests a lock that is held by Tj, Ti is only allowed to wait if Ti is older than Tj. Otherwise Ti is aborted immediately.
  Wound-wait: when a transaction Ti requests a lock that is held by Tj, Tj is aborted if Ti has a higher priority than Tj. Otherwise, Ti will wait.

In embodiments, the subject technology implements a distributed database (e.g., storage platform 104) for executing distributed transactions, and utilizes locking for concurrency control where any deadlocks are handled in a distributed manner by a particular execution node executing a particular transaction (e.g., execution node 302-1 and the like).

In some embodiments, the subject technology provides the following:

No false deadlocks: Deadlocks generally represent some bugs in the user's application code. By providing accurate and informative deadlock information, embodiments of the subject technology enables a user to fix these deadlocks.

Distributed/decentralized deadlock handling: transaction manager 440 is designed for executing distributed transactions in the cloud. In an embodiment, the transaction manager 440 creates one job (with one or more execution node workers) to execute a transaction. It can be desirable that each transaction handles deadlocks independently without requiring a centralized transaction manager.

The following discussion describes a deadlock detection and resolution protocol for the subject technology to meet the two aforementioned requirements. In order to meet the goal of no false deadlocks, the subject technology performs deadlock detection on the wait-for graph and only aborts a transaction if it finds a cycle in the graph. To meet a goal of not utilizing a centralized transaction manager, each transaction (e.g., executing on a given execution node) are able to exchange wait-for information and perform deadlock detection independently. Further, the subject technology implements a deadlock detection algorithm that is deterministic so that all transactions can unanimously agree on which transactions to abort.

In the following discussion, it is understood that statements in a transaction are executed serially e.g., one at a time. As discussed further below, the subject technology can then extend a deadlock detection protocol as described herein to support parallel statement execution.

In the discussion below, "transaction" and "statement" are used interchangeably because it is assumed that statements of a transaction will be executed serially, e.g., one at a time. In an example, the subject technology utilizes a deadlock detection and resolution protocol that enables transactions to store their wait-for information into a dedicated table in a distributed database (e.g., storage platform 104). A transaction waiting for conflicting transactions can periodically run a deterministic deadlock detection algorithm. If a transaction determines that it is a victim in a deadlock, the transaction can abort itself so that other transactions can proceed.

In some implementations, the execution platform 110 can provide deadlock handling logic 480 (e.g., deadlock handling logic 1 to deadlock handling logic N, which can correspond respectively to each transaction 420 to transaction 425) which implements the deadlock detection and resolution protocol mentioned herein, and is provided or utilized by each given execution node that is currently executing a given transaction(s). In another embodiment, each deadlock handling logic can be provided to a corresponding transaction (or statement within a transaction) for deadlock detection and resolution as described further herein.

In an embodiment, wait-for information of transactions is stored in a wait-for table in the distributed database (e.g., storage platform 104). The wait-for table includes a set of key-value pairs where both keys and values are transaction IDs. A key-value pair <Ti, Tj> means that Ti is currently waiting for Tj, e.g., there is an edge Ti→Tj in the wait-for graph.

In order to satisfy the deterministic requirement, each transaction Ti reports Ti→Tj only if Tj is the oldest conflicting transaction that Ti is waiting for (a transaction's age is determined by its transaction ID, e.g., a younger (e.g., newer) transaction will have a larger transaction ID). By ensuring that there is at most one ongoing edge from each transaction, it is straightforward to see that each transaction can participate in at most one cycle. Thus, the youngest transaction (with the largest transaction ID) can be aborted in each cycle to deterministically resolve deadlocks.

Figure 5:
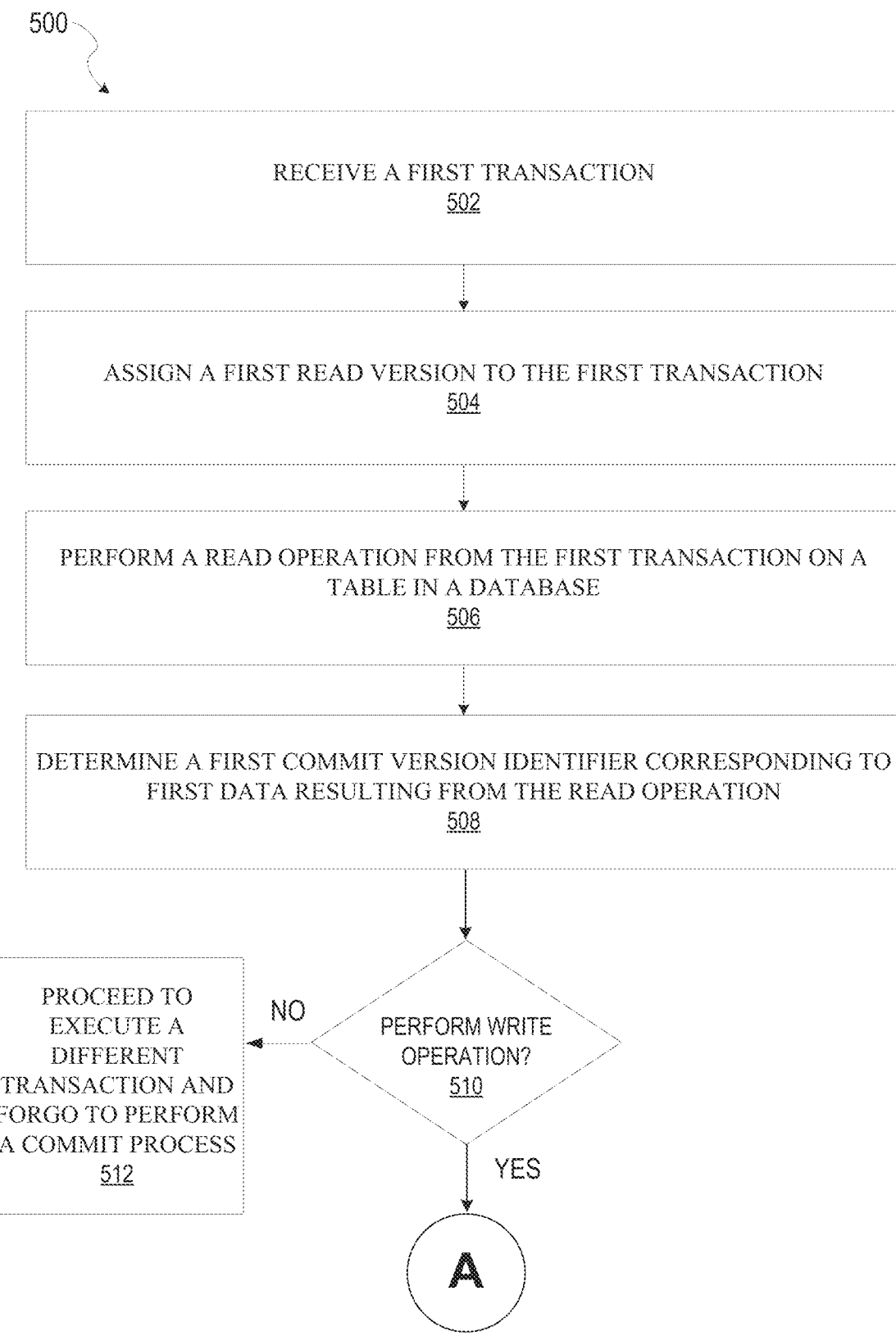
FIG. 5 is a flow diagram illustrating operations of a database system in performing a method, in accordance with some embodiments of the present disclosure.

FIG. 5 is a flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based database system 102, such as components of the compute service manager 108 or a node in the execution platform 110. Accordingly, the method 500 is described below, by way of example with reference thereto. However, it shall be appreciated that the method 500 may be deployed on various other hardware configurations and is not intended to be limited to deployment within the network-based database system 102.

At operation 502, the transaction manager 440 receives a first transaction, the first transaction to be executed on linearizable storage.

At operation 504, the transaction manager 440 assigns a first read version to the first transaction, the first read version indicating a first version of the linearizable storage. Alternatively, a read timestamp can be retrieved from a clock service (e.g., the clock service 130), and a transaction identifier can be assigned to the first transaction where the transaction identifier corresponds to a read start time.

At operation 506, the transaction manager 440 performs a read operation from the first transaction on a table in a database.

At operation 508, the transaction manager 440 determines a first commit version identifier corresponding to first data resulting from the read operation.

At operation 510, the transaction manager 440 determines whether a particular write operation is included in the first transaction. If the particular write operation is to be performed with the first transaction, then the transaction manager 440 proceeds to perform a method as described below in FIG. 7.

Alternatively, when the transaction manager 440 determines that a particular write operation is absent from the first transaction, at operation 512, the transaction manager 440 proceeds to execute a different transaction (along with foregoing to perform a commit process for the first transaction), which is described, in an example, in FIG. 6 below. It is appreciated that due to the concurrency of transactions that are performed, the operations described further below in FIG. 6 can be executed at any time during the operations described in FIG. 5 above.

Figure 6:
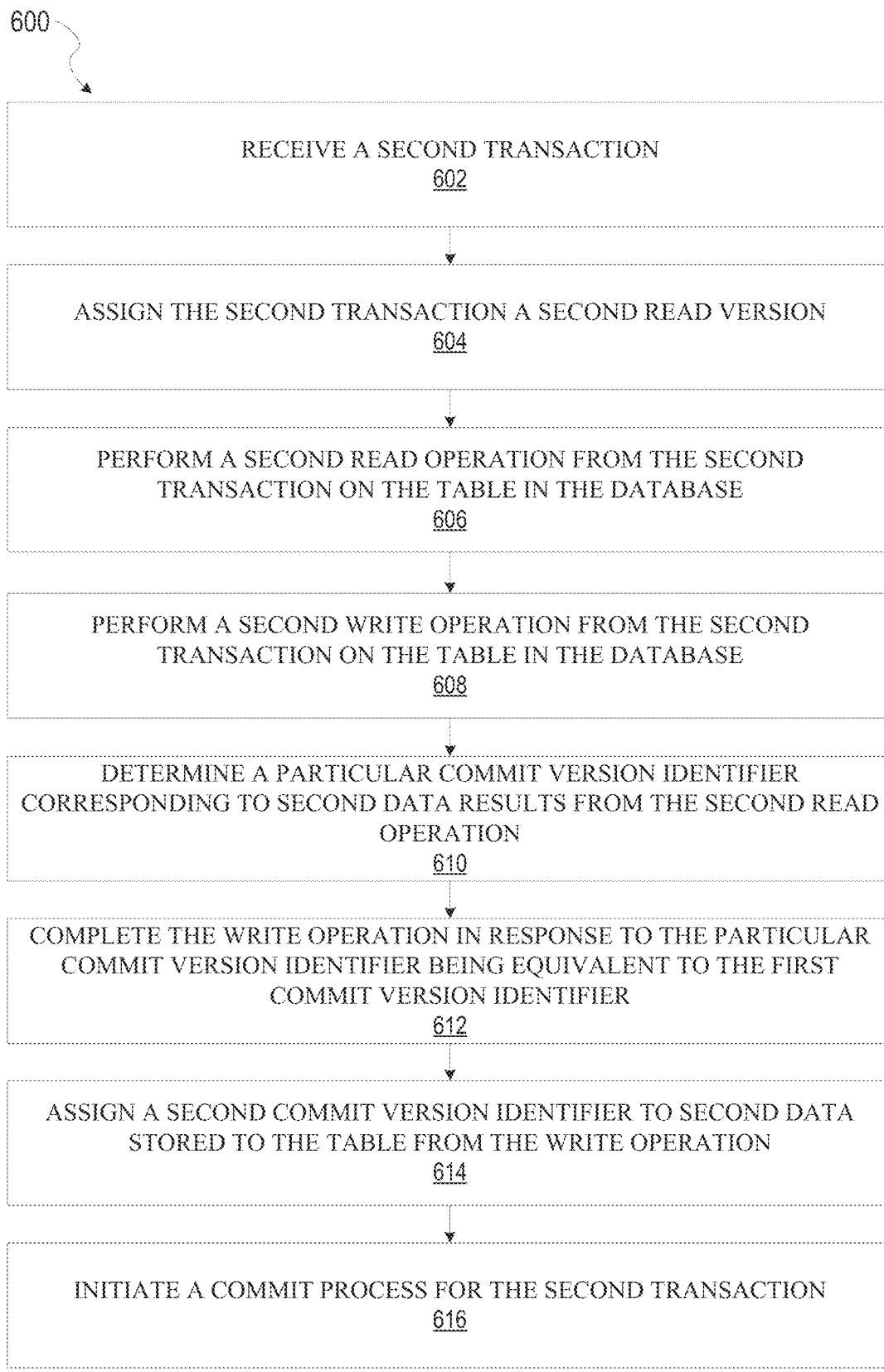
FIG. 6 is a flow diagram illustrating operations of a database system in performing a method, in accordance with some embodiments of the present disclosure.

FIG. 6 is flow diagram illustrating operations of a database system in performing a method, in accordance with some embodiments of the present disclosure. The method 600 may be embodied in computer-readable instructions for execution by one or more hardware components (e.g., one or more processors) such that the operations of the method 600 may be performed by components of network-based database system 102, such as components of the compute service manager 108 or a node in the execution platform 110. Accordingly, the method 600 is described below, by way of example with reference thereto. However, it shall be appreciated that the method 600 may be deployed on various other hardware configurations and is not intended to be limited to deployment within the network-based database system 102.

In some embodiments, the method 600 can be performed in conjunction with the method 500 as discussed above. For example, the method 600 can be performed after the operations of the method 500 or performed substantially concurrently with the method 500.

At operation 602, the transaction manager 440 receives a second transaction, the second transaction to be executed on linearizable storage.

At operation 604, the transaction manager 440 assigns the second transaction a second read version, the second read version indicating a second version of the linearizable storage.

At operation 606, the transaction manager 440 performs a second read operation from the second transaction on the table in the database.

At operation 608, the transaction manager 440 performs a second write operation from the second transaction on the table in the database.

At operation 610, the transaction manager 440 determines a particular commit version identifier corresponding to second data results from the second read operation.

At operation 612, the transaction manager 440 completes the write operation in response to the particular commit version identifier being equivalent to the first commit version identifier.

At operation 614, the transaction manager 440 assigns a second commit version identifier to second data stored to the table from the write operation, the second commit version identifier corresponding to a second version of data in the table, the second commit version identifier different than the first commit version identifier.

At operation 616, the transaction manager 440 initiates a commit process for the second transaction.

Figure 7:
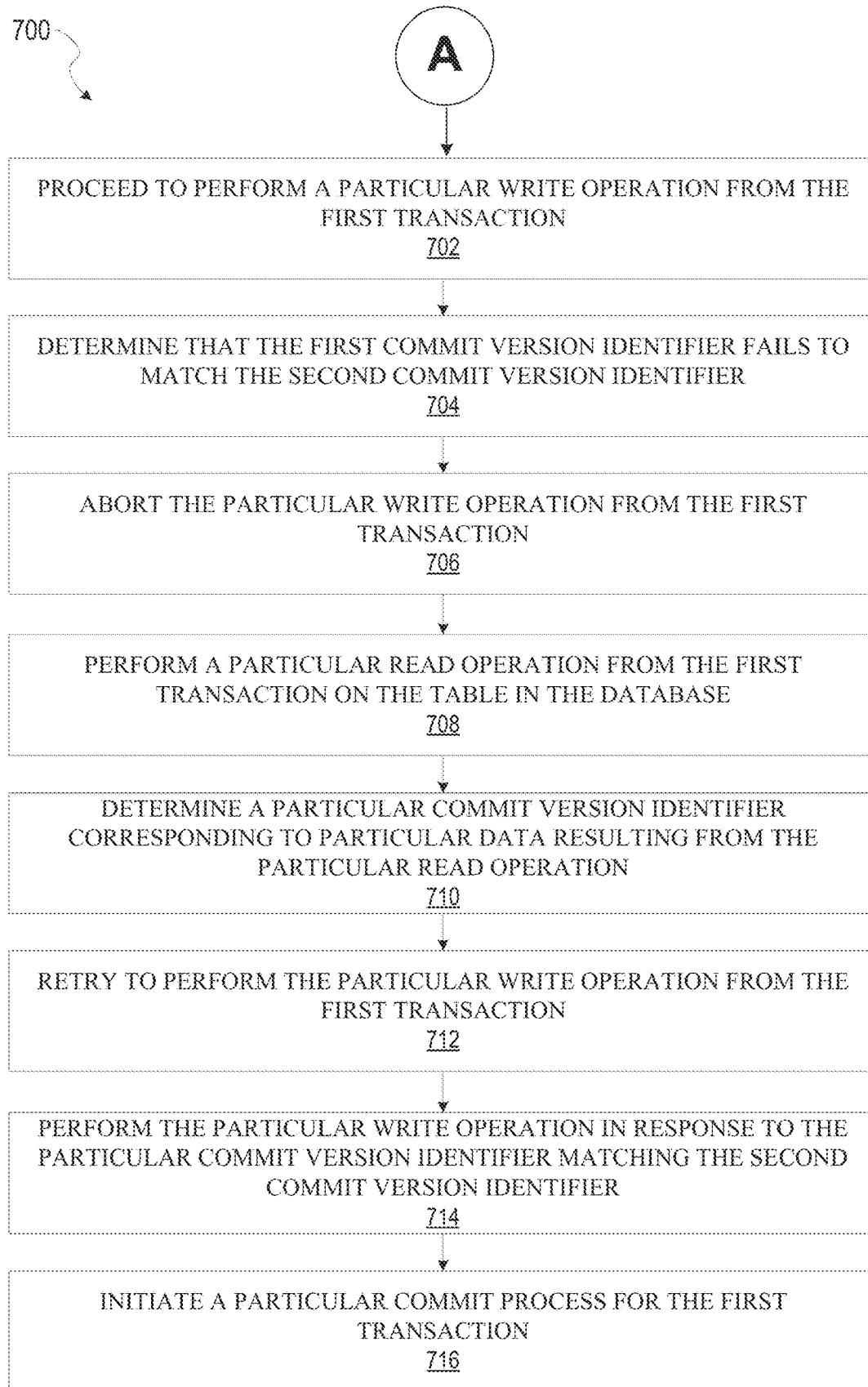
FIG. 7 is a flow diagram illustrating operations of a database system in performing a method, in accordance with some embodiments of the present disclosure.

FIG. 7 is a flow diagram illustrating operations of a database system in performing a method, in accordance with some embodiments of the present disclosure. The method 700 may be embodied in computer-readable instructions for execution by one or more hardware components (e.g., one or more processors) such that the operations of the method 700 may be performed by components of network-based database system 102, such as components of the compute service manager 108 or a node in the execution platform 110. Accordingly, the method 700 is described below, by way of example with reference thereto. However, it shall be appreciated that the method 700 may be deployed on various other hardware configurations and is not intended to be limited to deployment within the network-based database system 102.

In some embodiments, the method 700 can be performed in conjunction with the method 500 and the method 600 as discussed above. For example, the method 700 can be performed after the operations of the method 500 or the method 600 (or performed substantially concurrently therewith either method).

At operation 702, the transaction manager 440 proceeds to perform a particular write operation from the first transaction.

At operation 704, the transaction manager 440 determines that the first commit version identifier fails to match the second commit version identifier.

At operation 706, the transaction manager 440 aborts the particular write operation from the first transaction.

At operation 708, the transaction manager 440 performs a particular read operation from the first transaction on the table in the database.

At operation 710, the transaction manager 440 determines a particular commit version identifier corresponding to particular data resulting from the particular read operation.

At operation 712, the transaction manager 440 retry to perform the particular write operation from the first transaction.

At operation 714, the transaction manager 440 perform the particular write operation in response to the particular commit version identifier matching the second commit version identifier At operation 716, the transaction manager 440 initiates a particular commit process for the first transaction.

Many relational database systems provide support to modify table schema after the table is created. Users of such systems typically issue "alter table" SQL commands to modify the table schema. Some most common examples include add/drop column, change default value, etc.

In some existing OLAP (online analytical processing) tables in a database system, table metadata and user data (e.g., key value pairs) are stored separately. The system in this example has to read both metadata and data to execute user queries. Moreover, schema changes may only happen to the metadata so that it is kept simple and fast, i.e., no user data is altered when a table's schema is changed.

For some self-contained data serialization solutions (e.g., Apache Avro), schema information is stored alongside with the serialized data, and is dynamically resolved while reading the data. As a result, schema changes do not apply to these example solutions.

Embodiments of the subject technology support schema evolution for key-value tables, whose data is persisted in a row-oriented format and stored in key-value stores in an implementation. The advantages include, but not limited to, the following:

1. when compared to some existing database systems: embodiments of the subject technology enable schema changes that are metadata operations that do not change user data at execution time, and therefore results in a very fast operation.
2. when compared to some existing database systems: embodiments of the subject technology which enable schema changes do not acquire table level locks so that they are executed transactionally and do not block concurrent DML operations.
3. when compared to OLAP tables: embodiments of the subject technology enable table schema changes that are versioned and data in old versions may be automatically upgraded to new versions, to potentially save storage costs and boost query performance.
4. when compared to OLAP tables: embodiments of the subject technology enable some types of schema changes that are not supported by OLAP tables, such as changing the column's default value.

Embodiments of the subject technology support data definition language (DDL) operations on the value columns of key-value tables including adding and dropping columns, setting and dropping default values for columns, and setting and dropping the default sequence of a column.

In an embodiment, a metadata-oriented DDL operation(s) on key value tables can require the table schemas to be versioned. When there is a change to the table schema that affects how the key value pairs should be serialized and deserialized, it should be associated with a new schema ID (version).

As described further herein, schema information of a key-value table is stored in a metadata database and maintained by a compute service manager (e.g., compute service manager 108). In an example, schema information on a key-value table includes:

The full current schema, which contains the full table schema metadata including column names, logical types, etc., and which, in an example, is not different from the metadata of an OLAP-based table.

All previous versions of the sub-schema (a subset of the full table schema), which contain essential information that can be used by the key-value serializer to serialize and deserialize the key-value pairs. Such information includes column positions, column IDs and physical types, etc.

In embodiments, sub-schemas (e.g., different schema versions) can be built by a compute service manager (e.g., compute service manager 108) and persisted in the metadata database 112 at DDL time, if this DDL changes information tracked by sub-schemas. In an implementation, a copy of the sub-schema information is not stored in the storage platform 104. In another implementation such information may be stored in the metadata database 112 for on-disk caching and building tools that operate on data stores without having to communicate with a compute service manager (e.g., compute service manager 108).

In an embodiment, each key value pair has an schema identifier (ID) embedded in its value, which will be used to match it to the sub-schema version it is created from. Consequently, the key value pairs in a table may be associated with different sub-schema versions defined by a schema ID at the time this key value pair was created. To reduce entropy and improve read performance, a background job (similar to a compaction process) may be performed to upgrade rows from old schema versions to the latest version. Existing rows on old schema versions are also "lazily" upgraded to the latest schema when the rows are updated by DML (update SQL).

The following discussion relates to a compute service manager (e.g., compute service manager 108) that supports schema evolution. As mentioned herein, a dataflow language ("Dataflow Language") can be a programming language that is compatible with a given execution node of the subject system, and can be a programming language that is different than another programming language utilized for sending a database statement for execution to a compute service manager (which then utilizes the dataflow language to send database statement or operation(s) to the execution node for execution).

Figure 8:
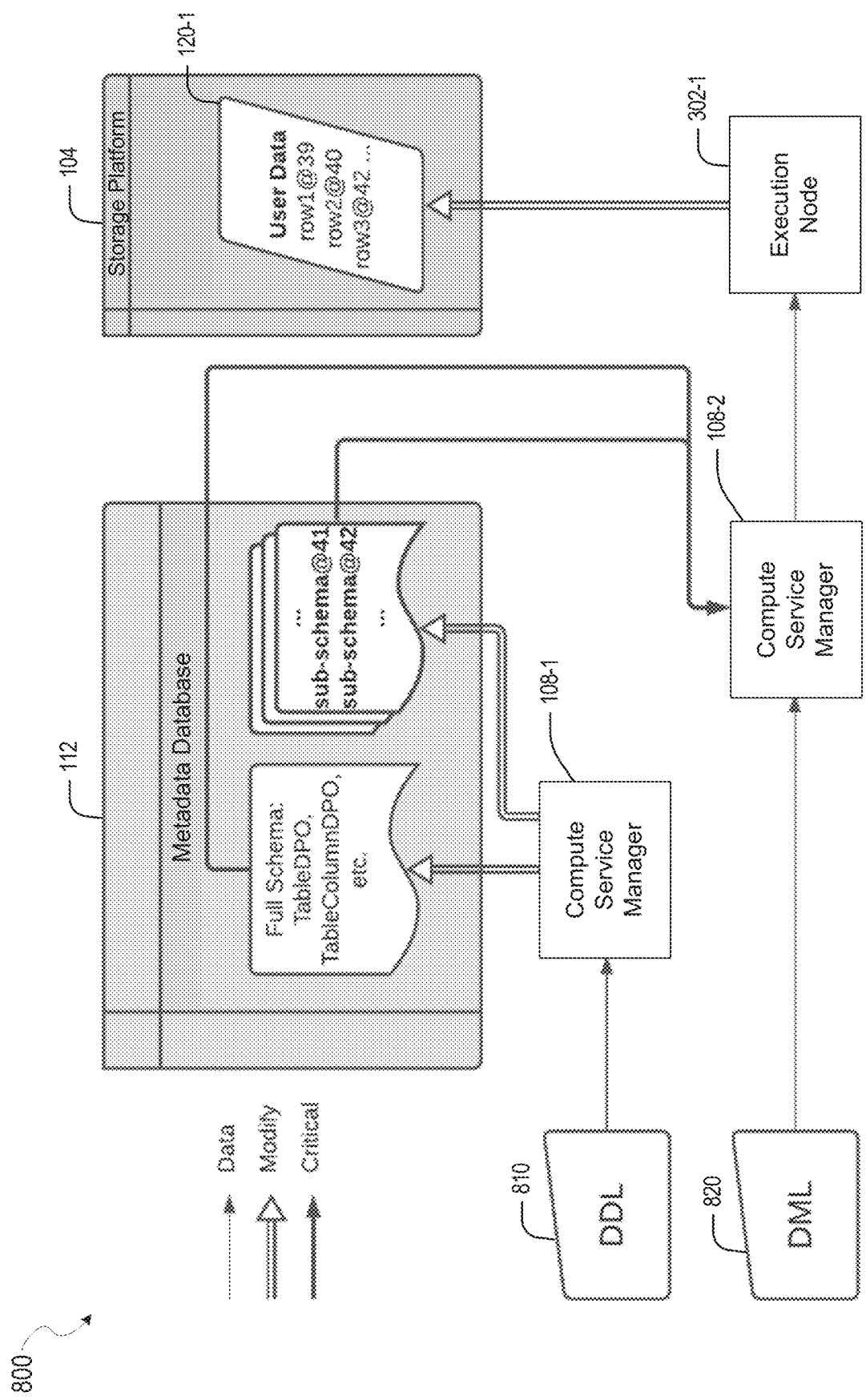
FIG. 8 is a block diagram depicting an example computing environment with a compute service manager(s) that provides schema evolution in accordance with embodiments of the subject technology.

FIG. 8 is a block diagram depicting an example computing environment 800 with a compute service manager(s) that provides schema evolution in accordance with embodiments of the subject technology. In the example of FIG. 8, multiple compute service managers are shown, however, it is appreciated that the operations described below can be performed by a single compute service manager. Moreover, although a particular execution node is shown for the purposes of explanation in FIG. 8, any appropriate execution node from FIG. 3 discussed before can be utilized.

In embodiments, schema evolution on key-value tables requires additional capabilities for a compute service manager (e.g., compute service manager 108) at DDL time and query/DML compilation time. More specifically, the compute service manager can provide the following capabilities:

At DDL time,
compute service manager (e.g., compute service manager 108-1) receives DDL 810 (e.g., including a set of DDL commands) and computes a hash signature that uniquely identifies the new sub-schema version and assigns a schema ID to it.

compute service manager (e.g., compute service manager 108-1) persists the new sub-schema, the hash to schema ID mapping and the schema ID of the table into metadata database 112.

At query compilation time,
compute service manager (e.g., compute service manager 108-2) determines the latest N sub-schema versions and sends them to an execution node (e.g., execution node 302-1) via a Dataflow Language (where N can be less than the total number of sub-schema versions of a table) or any other appropriate language.

At DML compilation time,
compute service manager (e.g., compute service manager 108-2) receives DML 820 (e.g., including a set of DML commands that each command may include a particular target table) computes a hash signature of each DML target's sub-schema and verifies that it exists in the list of historical sub-schema versions of this table. If the verification fails, recompilation can be triggered up to a particular number of times (e.g., 5 recompilations).

For DMLs that involve table scan operations, compute service manager (e.g., compute service manager 108-2) determines the latest N sub-schema versions from the metadata database 112 and sends them to an execution node (e.g., execution node 302-1) via the Dataflow Language.

During query execution,
compute service manager (e.g., compute service manager 108-2) opens an REST endpoint to serve sub-schema queries from an execution node (e.g., execution node 302-1) if an execution node encounters a key-value pair with a schema ID it does not get from the Dataflow Language.

the execution node performs DML commands (discussed further below) from the DML 820 on storage platform 104 where the table may be stored on a given storage device (e.g., storage device 120-1)

Although in the example of FIG. 8, the sub-schema versions are shown to be stored in metadata database 112, in some embodiments, such sub-schema versions and corresponding metadata and other information may be stored on storage platform 104 (e.g., on a given storage device provided by storage platform 104).

It is appreciated that not all DDL changes on a table generate new sub-schema versions (e.g., identified by schema ID). In some implementations, only add and drop column operations, which effectively changes the column list, can commence the generation and persistence of a new sub-schema entry.

In embodiments, DDL commands (e.g., alter, delete, drop, and the like) on key-value tables are performed by a compute service manager (e.g., compute service manager 108) with a metadata operation as described further below.

The following discussion relates to a DDL command to alter a table by adding a column.

Figure 9:
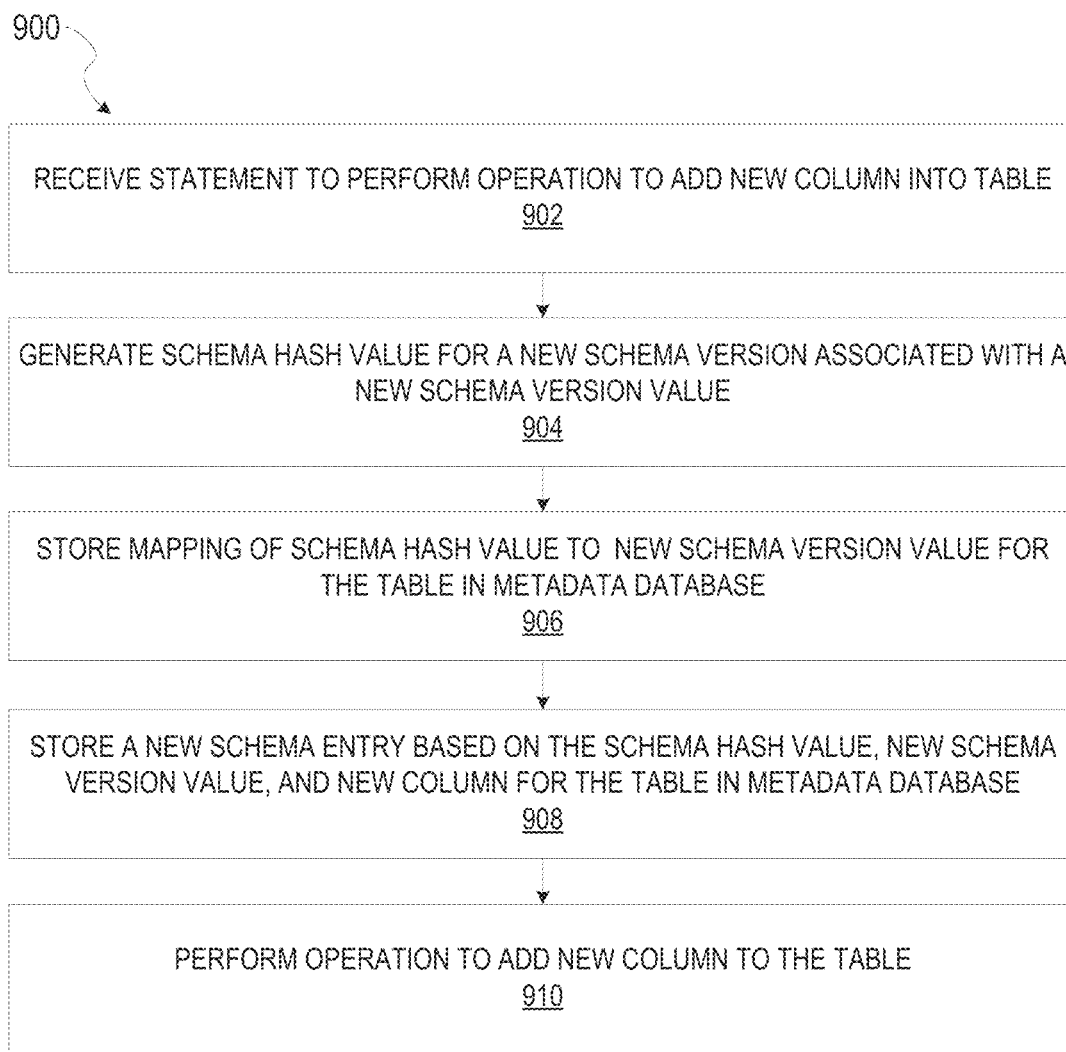
FIG. 9 is a flow diagram illustrating operations of a database system in performing a method, in accordance with some embodiments of the present disclosure.

FIG. 9 is a flow diagram illustrating operations of a database system in performing a method, in accordance with some embodiments of the present disclosure. The method 900 may be embodied in computer-readable instructions for execution by one or more hardware components (e.g., one or more processors) such that the operations of the method 900 may be performed by components of network-based database system 102, such as components of the compute service manager 108 or a node in the execution platform 110. Accordingly, the method 900 is described below, by way of example with reference thereto. However, it shall be appreciated that the method 900 may be deployed on various other hardware configurations and is not intended to be limited to deployment within the network-based database system 102.

In embodiments, adding and dropping columns of a key-value table generates a new sub-schema version. The compute service manager 108, for example, persists (e.g., stores) this new sub-schema version into the metadata database 112 (e.g., in the same transaction where TableColumnDPO is inserted or deleted).

In an implementation, a sub-schema signature (e.g., hash) is used to uniquely identify a sub-schema version. This sub-schema signature can be computed from the attributes of the list of columns in an example. Additionally, a TableDPO level schema ID attribute or value is introduced to reduce the space needed when stored into each data row, and to maintain ordering of schema changes. This schema ID attribute can be incremented from the previous schema ID corresponding to the previous sub-schema version.

In the scope of a single key-value table, one schema ID maps to one sub-schema signature, but one sub-schema signature can map to multiple schema IDs. In an example, a user drops the last added column from a table, which results in a column list exactly the same as the one before the last "add column" was executed.

The following relates to performing an operation to add a column to a given table.

At operation 902, the compute service manager 108 receives a statement to perform an operation to add a new column into a table. In an example, the operation is a DDL command (e.g., ALTER TABLE table_name ADD column_name datatype)

At operation 904, the compute service manager 108 generates a schema hash value for a new schema version associated with a new schema version value.

At operation 906, the compute service manager 108 stores a mapping of the schema hash value to the new schema version value for the table in a metadata database (e.g., the metadata database 112).

At operation 908, the compute service manager 108 stores a new schema entry based on the schema hash value, the new schema version value, and the new column for the table in the metadata database.

At operation 910, the compute service manager 108 performs an operation to add the new column to the table (e.g. inserts a new TableColumnDPO entry in the metadata database and increments the current sub-schema version field in the TableDPO previously persisted in the metadata database).

The following discussion relates to a DDL command to alter a table by dropping a column.

Similar to adding a column, dropping a column also generates a new sub-schema version. The new sub-schema entry includes all the previous information (e.g., from the previous schema version) except the dropped column compared to the previous schema version.

Dropping a column is a metadata operation that does not involve reclaiming any storage space. The storage space for the dropped column can be reclaimed at a later time when a schema version upgrade is commenced.

It is possible that after dropping a column, a sub-schema is exactly the same as one of the previous sub-schemas, an example of which would be to drop the column that was just added. In such cases, the schema ID is incremented but the new schema ID maps to an existing sub-schema signature.

The following discussion relates to a DDL command to truncate a table.

In an embodiment, a command to truncate a table does not restart the schema ID of the associated table. All previous sub-schema versions will be preserved. This is because 1) truncate is a DML operation that does not modify table metadata; and 2) time-travel queries are supported and data that exist prior to the truncation may be queried.

The following discussion relates to a DDL command to undrop a table.

Undropping a key-value table works in the same way as undropping an OLAP-based table in general. Sub-schema related information in the metadata database 112 is also recovered.

The following discussion relates to a DML command to perform an insert operation.

Figure 10:
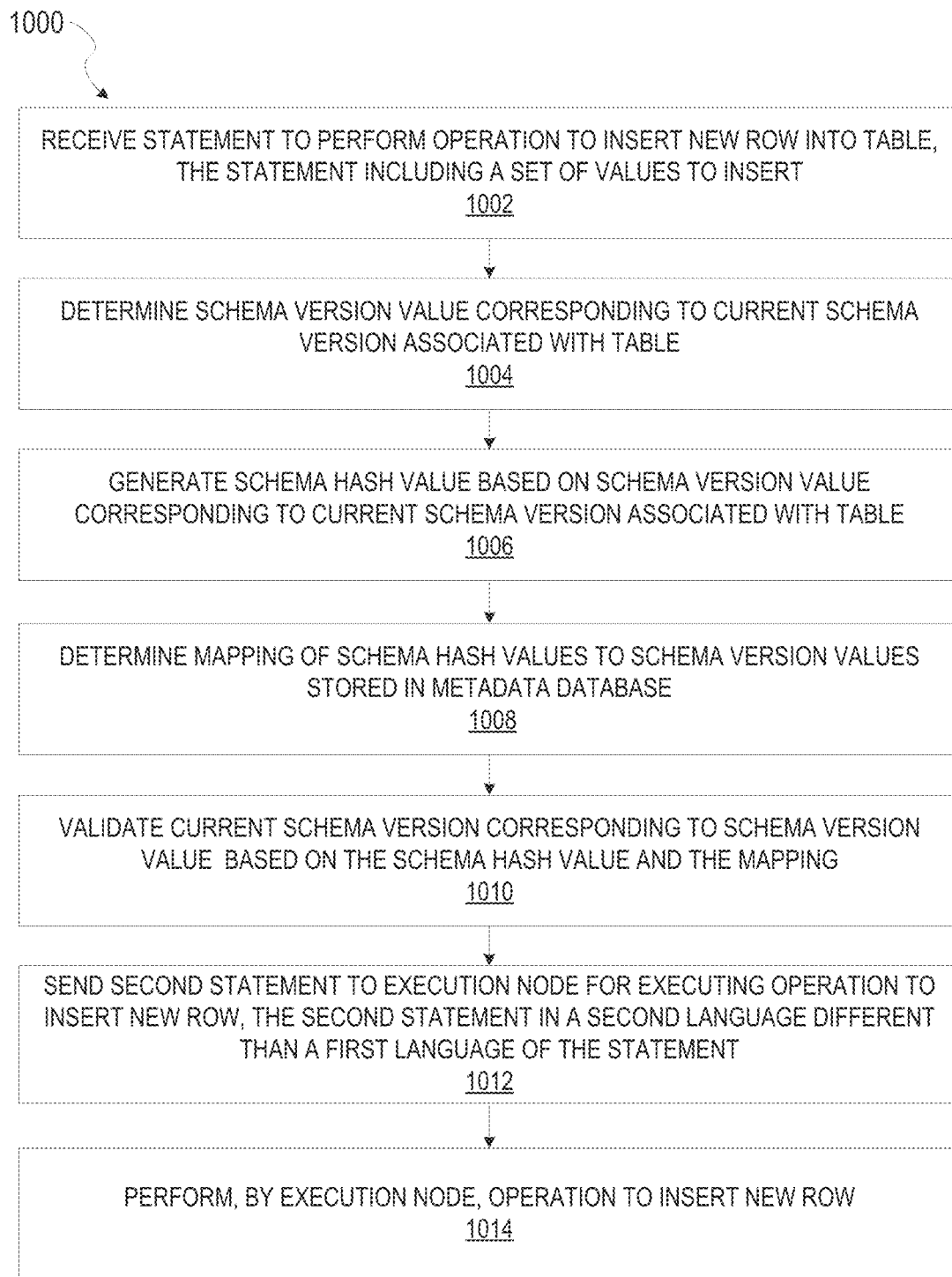
FIG. 10 is a flow diagram illustrating operations of a database system in performing a method, in accordance with some embodiments of the present disclosure.

FIG. 10 is a flow diagram illustrating operations of a database system in performing a method, in accordance with some embodiments of the present disclosure. The method 1000 may be embodied in computer-readable instructions for execution by one or more hardware components (e.g., one or more processors) such that the operations of the method 1000 may be performed by components of network-based database system 102, such as components of the compute service manager 108 or a node in the execution platform 110. Accordingly, the method 1000 is described below, by way of example with reference thereto. However, it shall be appreciated that the method 1000 may be deployed on various other hardware configurations and is not intended to be limited to deployment within the network-based database system 102.

Embodiments of the subject technology ensure a consistent metadata snapshot of a table for all DML targets during query compilation, otherwise an unfortunate consequence is that new rows are written with a sub-schema version that never existed and cannot be decoded at a later time.

To achieve consistent metadata of a table, an additional verification step is added to DML compilation in compute service manager (e.g., compute service manager 108). At DML compilation time, compute service manager (e.g., compute service manager 108) computes a hash signature of each DML target's sub-schema and verifies that it exists in the list of historical sub-schema versions of this table. If verification fails, an exception is thrown to commence a recompile operation (e.g., up to a number of times such as 5 times).

In some embodiments, as an optimization, column IDs are utilized in one version of the sub-schema as a predicate to read TableColumnDPOs to ensure that only the exact columns list that matches the current sub-schema version are retrieved. This can be done at the first recompilation to help reduce the total number of recompilations.

At operation 1002, the compute service manager 108 receives a first statement to perform an operation to insert a new row into a particular table, the statement including a set of values to insert.

At operation 1004, the compute service manager 108 determines a schema version value corresponding to a current schema version associated with the particular table.

At operation 1006, the compute service manager 108 generates a schema hash value based on the schema version value corresponding to the current schema version associated with the particular table.

At operation 1008, the compute service manager 108 determines a mapping of schema hash values to schema version values stored in the metadata database.

At operation 1010, the compute service manager 108 validates the current schema version corresponding to the schema version value based on the schema hash value and the mapping.

At operation 1012, the compute service manager 108 sends a second statement to an execution node for executing an operation to insert a new row, the second statement in a second language different than a first language of the statement. In an example, the second statement is in the Dataflow Language.

At operation 1014, the execution node performs the operation to insert the new row.

The following discussion relates to a command to perform a read operation (e.g., SELECT statement).

Figure 11:
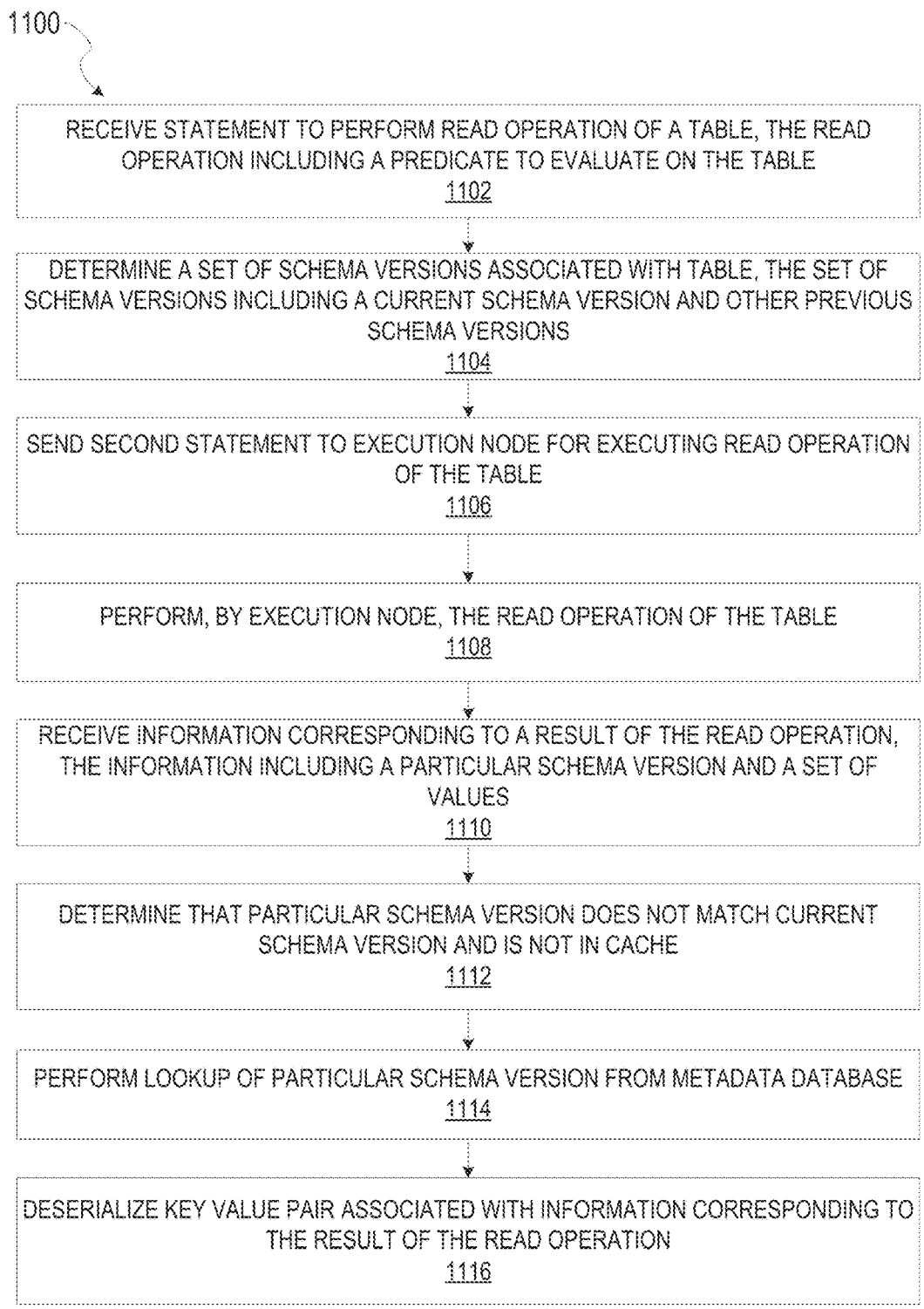
FIG. 11 is a flow diagram illustrating operations of a database system in performing a method, in accordance with some embodiments of the present disclosure.

FIG. 11 is a flow diagram illustrating operations of a database system in performing a method, in accordance with some embodiments of the present disclosure. The method 1100 may be embodied in computer-readable instructions for execution by one or more hardware components (e.g., one or more processors) such that the operations of the method 1100 may be performed by components of network-based database system 102, such as components of the compute service manager 108 or a node in the execution platform 110. Accordingly, the method 1100 is described below, by way of example with reference thereto. However, it shall be appreciated that the method 1100 may be deployed on various other hardware configurations and is not intended to be limited to deployment within the network-based database system 102.

The following discussion relates to an example of executing a select query. In an example, since a Dataflow Language contains the last N sub-schema versions, it is possible that while executing a key value table scan RSO (e.g., a row set operator that is a step in execution node platform that performs an action on database rows, e.g. scan, filter, etc.) in an execution node, a schema ID is encountered that is not included in the Dataflow Language. In this case, an execution node can make a REST request to a compute service manager (e.g., compute service manager 108) to query the missing schema ID. To mitigate potential performance issues, additional caching mechanisms (e.g., maintaining a replica of sub-schemas in the storage platform 104) to mitigate any performance issue(s).

In an example, there are two possible scenarios that a missing schema ID lookup can happen:
1. As discussed above, an old schema version is encountered that was not included in the N schemas passed down by the Dataflow Language. This can potentially be mitigated by increasing the value of N, the maximum of which is to include all previous sub-schema versions in the Dataflow Language. But the mitigation will compromise query performance, so a REST request to a compute service manager (e.g., compute service manager 108) is preferred.
2. One client starts a long running transaction (e.g., a full table scan) at time T1, it reaches an execution node and acquires a read timestamp RT1. Another client added a column at time T2, inserted a row at time T3 which has a subject system commit timestamp CT3. It is possible that T1<T2<T3 and RT1>CT3, therefore the full table scan operation can read the newly inserted row with a new schema version that did not exist when the query started at T1. This scenario cannot be mitigated by increasing the value of N. A REST request to the compute service manager (e.g., compute service manager 108) is needed.

At operation 1102, the compute service manager 108 receives a first statement to perform read operation of a particular table, the read operation including a predicate to evaluate on the particular table.

At operation 1104, the compute service manager 108 determines a set of schema versions associated with the particular table, the set of schema versions including a current schema version and other previous schema versions.

At operation 1106, the compute service manager 108 sends a second statement to an execution node for executing read operation of the particular table.

At operation 1108, the compute service manager 108 performs, by the execution node, the read operation of the particular table determining that particular schema version does not match the current schema version and is not in cache.

At operation 1110, the compute service manager 108 receives information corresponding to a result of the read operation, the information including a particular.

At operation 1112, the compute service manager 108 determines that the particular schema version does not match the current schema version and is not in a cache.

At operation 1114, the compute service manager 108 performs a lookup of the particular schema version from the metadata database.

At operation 1116, the compute service manager 108 deserializes a key value pair associated with information corresponding to the result of the read operation.

The following discussion relates to a DML command to perform an update operation.

Figure 12:
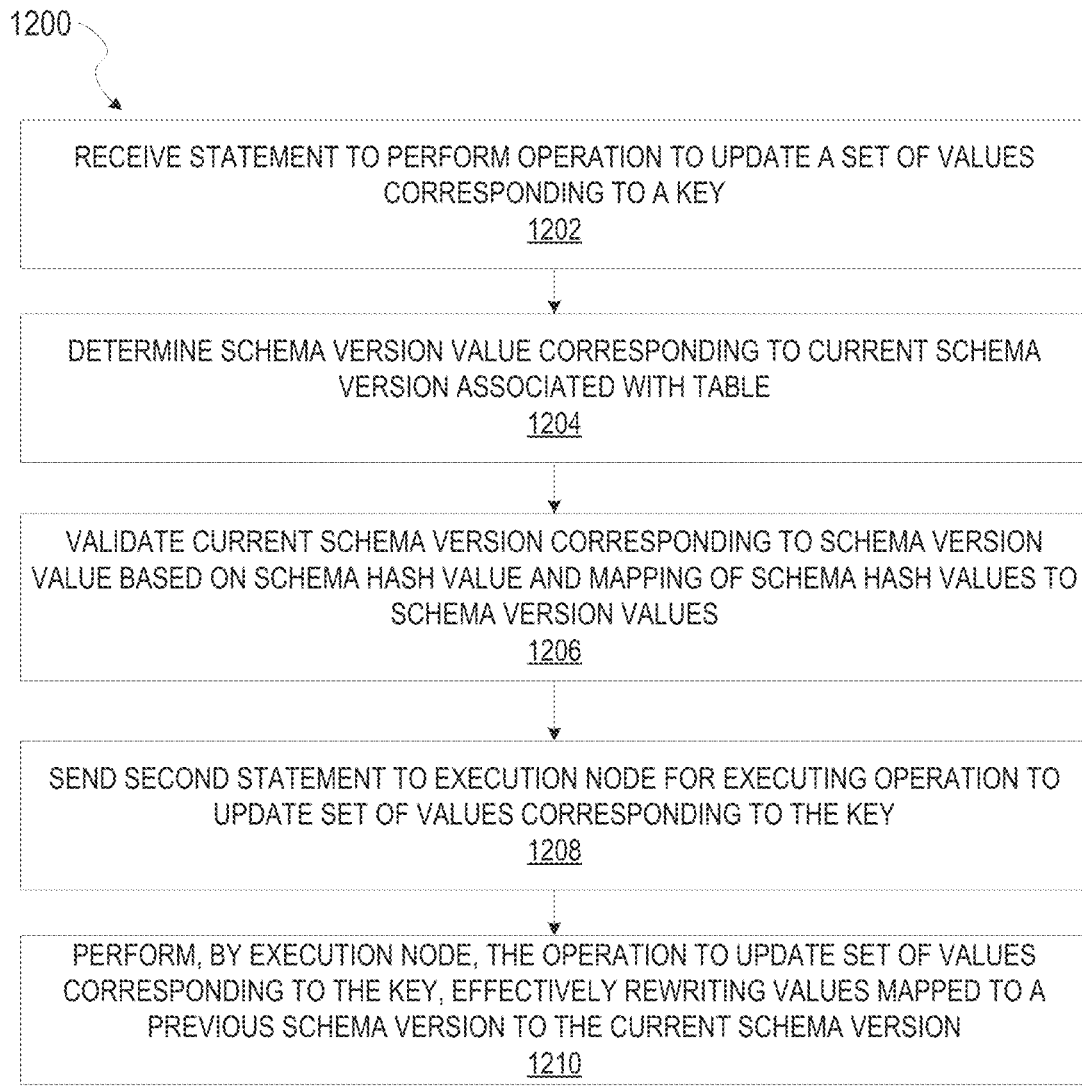
FIG. 12 is a flow diagram illustrating operations of a database system in performing a method, in accordance with some embodiments of the present disclosure.

FIG. 12 is a flow diagram illustrating operations of a database system in performing a method, in accordance with some embodiments of the present disclosure. The method 1200 may be embodied in computer-readable instructions for execution by one or more hardware components (e.g., one or more processors) such that the operations of the method 1200 may be performed by components of network-based database system 102, such as components of the compute service manager 108 or a node in the execution platform 110. Accordingly, the method 1200 is described below, by way of example with reference thereto. However, it shall be appreciated that the method 1200 may be deployed on various other hardware configurations and is not intended to be limited to deployment within the network-based database system 102.

The following discussion relates to an example of an update DML statement built upon the previous insert DML example. An update statement on a key-value table writes the row with the sub-schema version defined in the Dataflow Language, which implicitly upgrades the existing row from an older sub-schema version to a newer one.

At operation 1202, the compute service manager 108 receives a first statement to perform an operation to update a set of values corresponding to a key.

At operation 1204, the compute service manager 108 determines a schema version value corresponding to a current schema version associated with a particular table.

At operation 1206, the compute service manager 108 validates the current schema version corresponding to a schema version value based on a schema hash value and mapping of schema hash values to the schema version values.

At operation 1208, the compute service manager 108 sends a second statement to an execution node for executing operation to update a set of values corresponding to the key.

At operation 1210, the compute service manager 108 performs, by the execution node, the operation to update the set of values corresponding to the key, effectively rewriting values mapped to a previous schema version to the current schema version. The updated set of values to the key can therefore be considered values that were previously mapped to the previous schema version, which are now remapped to the current schema version.

The following discussion relates to default value resolution and default value behavior.

In embodiments, the expected handling for default values is the following:

When adding a new column with a default value to an existing table, all previous rows should have the newly added column with this default value.

When changing a column's default value, only new rows inserted after this change are assigned this new default value. Existing rows are not affected.

Dropping a default value is equivalent to setting it to null. The following examples illustrate this behavior.

| Query | Outcome |
| --- | --- |
| select * from kv | pk = 0, a = 102, b = null<br>pk = 1, a = 101, b = 201 |
| alter table kv add<br>(c number default 10) | success |
| select * from kv | pk = 0, a = 102, b = null, c = 10<br>pk = 1, a = 101, b = 201, c = 10 |
| insert into kv (pk, a, b)<br>values (2, 102, 202) | success |
| select * from kv | pk = 0, a = 102, b = null, c = 10<br>pk = 1, a = 101, b = 201, c = 10<br>pk = 2, a = 102, b = 202, c = 10 |
| alter table kv<br>modify c default 20 | success |
| select * from kv | pk = 0, a = 102, b = null, c = 10<br>pk = 1, a = 101, b = 201, c = 10<br>pk = 2, a = 102, b = 202, c = 10 |
| insert into kv (pk, a, b)<br>values (3, 103, 203) | success |
| select * from kv | pk = 0, a = 102, b = null, c = 10<br>pk = 1, a = 101, b = 201, c = 10<br>pk = 2, a = 102, b = 202, c = 10<br>pk = 3, a = 103, b = 203, c = 20 |

The following discussion relates to adding a column with a default value.

A default value of a column is a scalar SQL expression, which can be either a constant value or a function evaluated independently (such as random( )) or based on values of other columns. If the default value of a column is defined at table creation time, both constant value and SQL function can be used. If a column with a default value is added after the table is created, then only constant value is allowed as default.

Adding a column with a default value will log the default value expression in TableColumnDPO stored in the metadata database. When a value column is first added, the static default values are not materialized into existing user data but are dynamically resolved at query execution time. an execution node relies on the default value defined in the Dataflow Language to resolve the values for missing columns at run time.

The following discussion relates to selecting from a table with a newly added column with default value.

In an example, a new column c with default value 10 is added with schema ID 43. A select query is then issued to this table and the serializer gets back two key-value pairs with schema ID 42. It then issues a sub-schema read to data FDB to retrieve the previous schema version 42. It discovers that schema version 42 does not have column c, so it is newly added in version 43. The serializer will then fill column c in the result with value 10 before returning the result to upper layers.

The following discussion relates to setting or dropping the default value of a value column.

In addition to defining a default value at column creation time, the OLTP schema evolution project also introduces changing a column's default value which currently is not supported by OLAP tables. According to the default value behavior, changing a column's default value will only affect new rows inserted after the change.

In embodiments, a new TableColumnDPO attribute active_default will be introduced to store the new default value after a change while the existing default attribute stores the initial default value at column creation time. If active_default is missing, it is considered to have the same value as the default attribute.

In an example, both the default and active_default attributes are not stored as part of the sub-schema, hence changing the default value of a column does not need to be associated with a new schema ID. This is because the serializer won't rely on any previous versions of default value to decode a row.

When a row is inserted with a column that has a default value, and the insert statement does not specify that column, the default value will be materialized to that row. At DML time, a query optimizer at a compute service manager (e.g., compute service manager 108) will consult the active_default attribute to rewrite any missing column expressions with the outcome of default expression evaluation. The active_default attribute does not need to be sent to an execution node via the Dataflow Language.

If a row created before the addition of a column with default value is later updated by DML, we shall materialize the default value for this row since it will be upgraded to a newer schema ID.

The following discussion relates to default sequences of a column.

For default values generated by a sequence, they are always materialized into the row data. For OLAP-based tables, a default sequence can be added to a table column only when this table is empty so that a default sequence is allowed to be added to a table column only when no DMLs have been executed on this table.

The following discussion relates to a serializer component (e.g., part of the compute service manager 108) that can be utilized for schema resolution.

In embodiments, during a table scan operation, a serializer will be requested to return a list of columns identified by column IDs. In an example, column ID corresponds to the "ordinal" attribute of TableColumnDPO. Column ID is a table-local monotonously increasing sequence maintained at the metadata database 112 (TableDPO::lastColumnId) which will not be reused for different columns of the same table.

Given a key value pair, the serializer will need to know the total number of columns, and their data type categories (fixed-size or variable-size) to properly build column offsets to the value section. It will then rely on a map of (column ID→value column position) to properly serve requests on different column IDs. In the context of schema evolution, these three attributes are unique per schema ID, and need to be retrieved from the Dataflow Language.

In order to properly decode a column identified by its column ID, the serializer will further request these column metadata: physical data type and default value. In an example, these column metadata are only used when a column is actually being decoded, therefore, only those corresponding to the schema ID inside the Dataflow Language are needed.

The following discussion relates to sub-schema Management in a compute service manager (e.g., compute service manager 108).

In embodiments, in order for an execution node to correctly deserialize a key value pair, the Dataflow Language needs to contain a history of sub-schema versions that were used to create the key value pairs. Since the key-value serializer works on physical column positions and types, sub-schemas in the Dataflow Language needs to contain the following necessary attributes for value columns:

Column ID.
Serialized index of this column in the key or value part.
The logical type of this column.

The following discussion relates to a sub-schema layout.

The values of the sub-schemas will be stored in a self-contained, backward-compatible format such as JSON and the like.

Some example entries of sub-schemas for the table key value mentioned above is as follows:

```
// schemaId=42==>
{
"keyColumns": [
{
  "ordinal": 1,
  "index": 0, "logicalType": "fixed"
}
],
"valueColumns": [
{
  "ordinal": 10,
  "index": 0, "logicalType": "real"
},
{
  "ordinal": 11,
  "index"; 1, "logicalType":
  "text"
}
],
"signature":
"9e9d4acb8a08e093f163f3d69d701bb5f82f1ae7384b3-
ad62f0f65a36c65cf78",
"signatureVersion": 0
}
```

The following discussion relates to signature computation.

The signature of a sub-schema entry is to uniquely identify a sub-schema version relative to serialization and deserialization of a key value pair. Schema ID is considered to be a table-local alias of the signature to optimize storage space.

The signature is computed in a compute service manager (e.g., compute service manager 108) and is defined as the sum of hash values of all attributes of value columns necessary for deserialization (as mentioned above). SHA256 algorithm will be used to compute the hash values. For example, in the sub-schema entry above, the signature will be computed as:

$$\text{Sum over all value columns}(\text{hash}(\text{id})+\text{hash}(\text{index})+\text{hash}(\text{fixedSize}))$$

The following discussion relates to schema ID.

Here are the key requirements for the schema ID of key value tables:

It is embedded in the value section of each row.
It is mapped to one sub-schema signature which subsequently uniquely identifies a schema version.
Only the add/drop column DDLs shall trigger a schema ID change.
Uniqueness and consistency shall be guaranteed within a key-value table.
It needs to be handled in backup and restore.

In embodiments, the int64_t schema ID (aka schema version) will be associated with the sha256 identifier which will be mapped to the actual sub-schema. A single int64_t schema version can be associated with only one sha256 identifier. One sha256 identifier can be associated with multiple int64_t schema version identifiers. Sub-schema is an immutable JSON document serialized as a DPO keyed by {accountId, tableId, sha256}. The int64_t schema version to sha256 mapping will be represented as a DPO slice.

Figure 13:
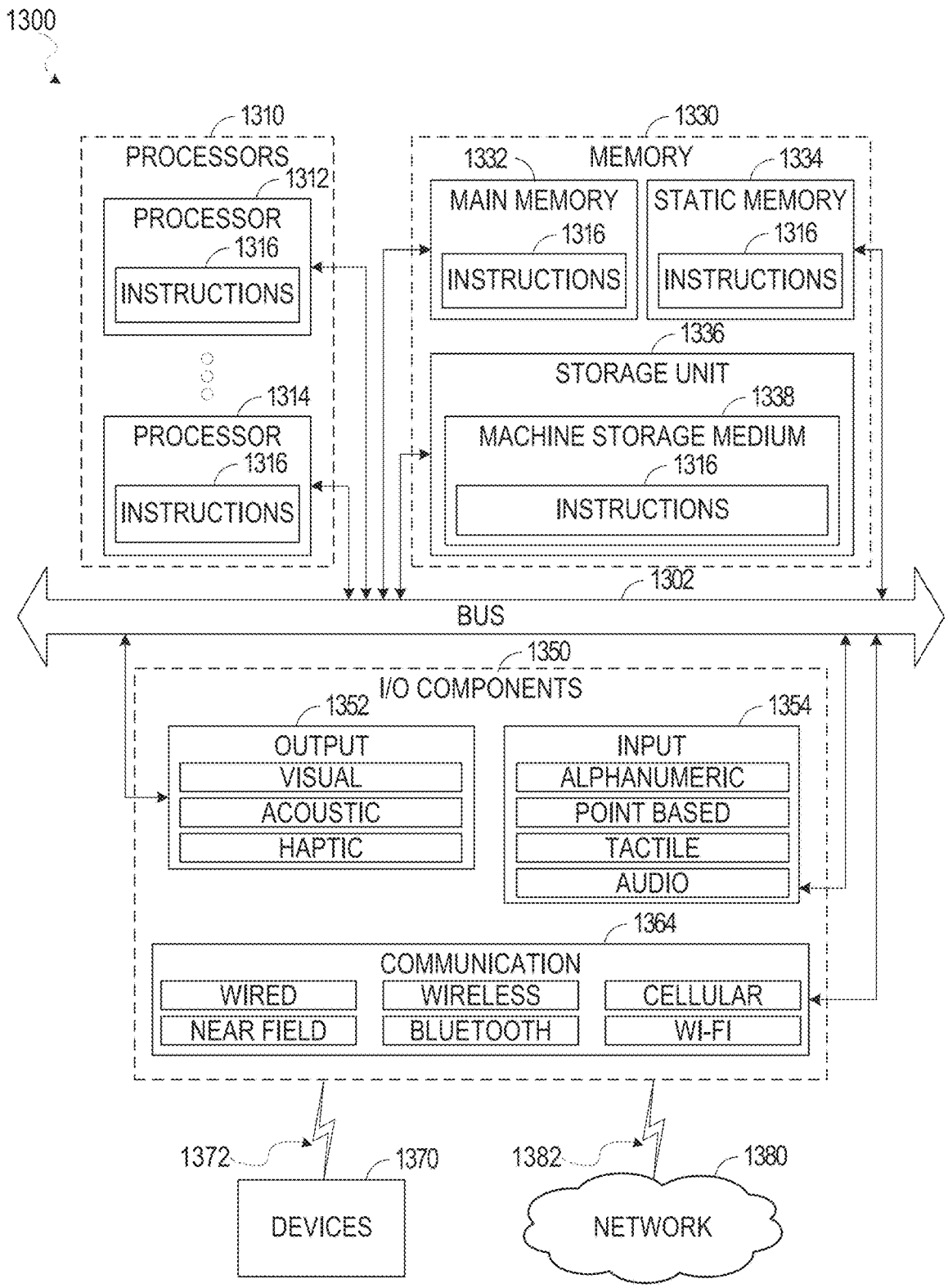
FIG. 13 illustrates a diagrammatic representation of a machine in the form of a computer system within which a set of instructions may be executed for causing the machine to perform any one or more of the methodologies discussed herein, in accordance with some embodiments of the present disclosure.

FIG. 13 illustrates a diagrammatic representation of a machine 1300 in the form of a computer system within which a set of instructions may be executed for causing the machine 1300 to perform any one or more of the methodologies discussed herein, according to an example embodiment. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example, the instructions 1316 may cause the machine 1300 to execute any one or more operations of the methods described above. As another example, the instructions 1316 may cause the machine 1300 to implement portions of the data flows illustrated in at least FIG. 4 or FIG. 8. In this way, the instructions 1316 transform a general, non-programmed machine into a particular machine 1300 (e.g., the compute service manager 108 or a node in the execution platform 110) that is specially configured to carry out any one of the described and illustrated functions in the manner described herein.

In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 includes processors 1310, memory 1330, and input/output (I/O) components 1350 configured to communicate with each other such as via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1316. The term "processor" is intended to include multi-core processors 1310 that may comprise two or more independent processors (sometimes referred to as "cores") that may execute instructions 1316 contemporaneously. Although FIG. 13 shows multiple processors 1310, the machine 1300 may include a single processor with a single core, a single processor with multiple cores (e.g., a multi-core processor), multiple processors with a single core, multiple processors with multiple cores, or any combination thereof.

The memory 1330 may include a main memory 1332, a static memory 1334, and a storage unit 1336, all accessible to the processors 1310 such as via the bus 1302. The main memory 1332, the static memory 1334, and the storage unit 1336 store the instructions 1316 embodying any one or more of the methodologies or functions described herein. The instructions 1316 may also reside, completely or partially, within the main memory 1332, within the static memory 1334, within machine storage medium 1338 of the storage unit 1336, within at least one of the processors 1310 (e.g., within the processor's cache memory), or any suitable combination thereof, during execution thereof by the machine 1300.

The I/O components 1350 include components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or another suitable device to interface with the network 1380. In further examples, the communication components 1364 may include wired communication components, wireless communication components, cellular communication components, and other communication components to provide communication via other modalities. The devices 1370 may be another machine or any of a wide variety of peripheral devices (e.g., a peripheral device coupled via a universal serial bus (USB)). For example, as noted above, the machine 1300 may correspond to any one of the compute service manager 108 or the execution platform 110, and the devices 1370 may include the client device 114 or any other computing device described herein as being in communication with the network-based database system 102 or the cloud storage platform 104.

Executable Instructions and Machine Storage Medium

The various memories (e.g., 1330, 1332, 1334, and/or memory of the processor(s) 1310 and/or the storage unit 1336) may store one or more sets of instructions 1316 and data structures (e.g., software) embodying or utilized by any one or more of the methodologies or functions described herein. These instructions 1316, when executed by the processor(s) 1310, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1380 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to the devices 1370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1316 for execution by the machine 1300, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some embodiments, the processor or processors may be located in a single location (e.g., within a home environment, an office environment, or a server farm), while in other embodiments the processors may be distributed across a number of locations.

CONCLUSION

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   a memory storing instructions that cause the at least one hardware processor to perform operations comprising:
   receiving, by a compute service manager, a statement to perform an operation to add a new column into a table;
   generating, by the compute service manager, a schema hash value for a new schema version associated with a new schema version value, the schema hash value based on determining a sum of hash values of a set of attributes of value columns, the set of attributes comprises a column identifier, an index of a column, and a logical type of the column, the index of the column corresponding to a column position;
   storing a mapping of the schema hash value to the new schema version value for the table in a metadata database;
   storing a new schema entry based on the schema hash value, the new schema version value, and the new column for the table in the metadata database, the metadata database storing multiple entries for different schema versions, each entry including a particular schema hash value for mapping to a corresponding schema version from the different schema versions; and performing, by the compute service manager, an operation to add the new column to the table.

2. The system of claim 1, wherein the operations further comprise:
receiving a first statement to perform an operation to insert a new row into a particular table, the statement including a set of values to insert;
determining a schema version value corresponding to a current schema version associated with the particular table;
generating a schema hash value based on the schema version value corresponding to the current schema version associated with the particular table;
determining a mapping of schema hash values to schema version values stored in the metadata database; and
validating the current schema version corresponding to the schema version value based on the schema hash value and the mapping.

3. The system of claim 2, wherein the operations further comprise:
sending a second statement to an execution node for executing an operation to insert a new row, the second statement in a second language different than a first language of the statement; and
performing, by the execution node, the operation to insert the new row.

4. The system of claim 1, wherein the operations further comprise:
receiving a first statement to perform a read operation of a particular table, the read operation including a predicate to evaluate on the particular table;
determining a set of schema versions associated with the particular table, the set of schema versions including a current schema version and other previous schema versions;
sending a second statement to an execution node for executing the read operation of the particular table; and
performing, by the execution node, the read operation of the particular table.

5. The system of claim 4, wherein the operations further comprise:
receiving information corresponding to a result of the read operation, the information including a particular schema version and a set of values;
determining that the particular schema version does not match a current schema version and is not in a cache;
performing a lookup of the particular schema version from the metadata database; and
deserializing a key value pair associated with information corresponding to the result of the read operation.

6. The system of claim 1, wherein the operations further comprise:
receiving a first statement to perform an operation to update a set of values corresponding to a key;
determining a schema version value corresponding to a current schema version associated with a particular table; and
validating the current schema version corresponding to a schema version value based on a schema hash value and a mapping of schema hash values to the schema version value.

7. The system of claim 6, wherein the operations further comprise:

sending a second statement to an execution node for executing the operation to update the set of values corresponding to the key; and
performing, by the execution node, the operation to update the set of values corresponding to the key.

8. The system of claim 1, wherein the metadata database stores a table of schema version values corresponding to different schema versions, and a particular schema hash value corresponding to each schema version value from the schema version values, each particular schema hash value being different than other schema hash values.

9. A method comprising:
receiving, by a compute service manager, a statement to perform an operation to add a new column into a table;
generating, by the compute service manager, a schema hash value for a new schema version associated with a new schema version value, the schema hash value based on determining a sum of hash values of a set of attributes of value columns, the set of attributes comprises a column identifier, an index of a column, and a logical type of the column, the index of the column corresponding to a column position;
storing a mapping of the schema hash value to the new schema version value for the table in a metadata database;
storing a new schema entry based on the schema hash value, the new schema version value, and the new column for the table in the metadata database, the metadata database storing multiple entries for different schema versions, each entry including a particular schema hash value for mapping to a corresponding schema version from the different schema versions; and
performing, by the compute service manager, an operation to add the new column to the table.

10. The method of claim 9, further comprising:
receiving a first statement to perform an operation to insert a new row into a particular table, the statement including a set of values to insert;
determining a schema version value corresponding to a current schema version associated with the particular table;
generating a schema hash value based on the schema version value corresponding to the current schema version associated with the particular table;
determining a mapping of schema hash values to schema version values stored in the metadata database; and
validating the current schema version corresponding to the schema version value based on the schema hash value and the mapping.

11. The method of claim 10, further comprising:
sending a second statement to an execution node for executing an operation to insert a new row, the second statement in a second language different than a first language of the statement; and
performing, by the execution node, the operation to insert the new row.

12. The method of claim 9, further comprising:
receiving a first statement to perform a read operation of a particular table, the read operation including a predicate to evaluate on the particular table;
determining a set of schema versions associated with the particular table, the set of schema versions including a current schema version and other previous schema versions;
sending a second statement to an execution node for executing the read operation of the particular table; and performing, by the execution node, the read operation of the particular table.

13. The method of claim 12, further comprising:
receiving information corresponding to a result of the read operation, the information including a particular schema version and a set of values;
determining that the particular schema version does not match a current schema version and is not in a cache;
performing a lookup of the particular schema version from the metadata database; and
deserializing a key value pair associated with information corresponding to the result of the read operation.

14. The method of claim 9, further comprising:
receiving a first statement to perform an operation to update a set of values corresponding to a key;
determining a schema version value corresponding to a current schema version associated with a particular table; and
validating the current schema version corresponding to a schema version value based on a schema hash value and a mapping of schema hash values to the schema version value.

15. The method of claim 14, further comprising:
sending a second statement to an execution node for executing the operation to update the set of values corresponding to the key; and
performing, by the execution node, the operation to update the set of values corresponding to the key.

16. The method of claim 9, wherein the metadata database stores a table of schema version values corresponding to different schema versions, and a particular schema hash value corresponding to each schema version value from the schema version values, each particular schema hash value being different than other schema hash values.

17. A non-transitory computer-storage medium comprising instructions that, when executed by one or more processors of a machine, configure the machine to perform operations comprising:
receiving, by a compute service manager, a statement to perform an operation to add a new column into a table;
generating, by the compute service manager, a schema hash value for a new schema version associated with a new schema version value, the schema hash value based on determining a sum of hash values of a set of attributes of value columns, the set of attributes comprises a column identifier, an index of a column, and a logical type of the column, the index of the column corresponding to a column position;
storing a mapping of the schema hash value to the new schema version value for the table in a metadata database;
storing a new schema entry based on the schema hash value, the new schema version value, and the new column for the table in the metadata database, the metadata database storing multiple entries for different schema versions, each entry including a particular schema hash value for mapping to a corresponding schema version from the different schema versions; and
performing, by the compute service manager, an operation to add the new column to the table.

18. The non-transitory computer-storage medium of claim 17, wherein the operations further comprise:
receiving a first statement to perform an operation to insert a new row into a particular table, the statement including a set of values to insert;
determining a schema version value corresponding to a current schema version associated with the particular table;
generating a schema hash value based on the schema version value corresponding to the current schema version associated with the particular table;
determining a mapping of schema hash values to schema version values stored in the metadata database; and
validating the current schema version corresponding to the schema version value based on the schema hash value and the mapping.

19. The non-transitory computer-storage medium of claim 18, wherein the operations further comprise:
sending a second statement to an execution node for executing an operation to insert a new row, the second statement in a second language different than a first language of the statement; and
performing, by the execution node, the operation to insert the new row.

20. The non-transitory computer-storage medium of claim 17, wherein the operations further comprise:
receiving a first statement to perform a read operation of a particular table, the read operation including a predicate to evaluate on the particular table;
determining a set of schema versions associated with the particular table, the set of schema versions including a current schema version and other previous schema versions;
sending a second statement to an execution node for executing the read operation of the particular table; and
performing, by the execution node, the read operation of the particular table.

21. The non-transitory computer-storage medium of claim 20, wherein the operations further comprise:
receiving information corresponding to a result of the read operation, the information including a particular schema version and a set of values;
determining that the particular schema version does not match a current schema version and is not in a cache;
performing a lookup of the particular schema version from the metadata database; and
deserializing a key value pair associated with information corresponding to the result of the read operation.

22. The non-transitory computer-storage medium of claim 17, wherein the operations further comprise:
receiving a first statement to perform an operation to update a set of values corresponding to a key;
determining a schema version value corresponding to a current schema version associated with a particular table; and
validating the current schema version corresponding to a schema version value based on a schema hash value and a mapping of schema hash values to the schema version value.

23. The non-transitory computer-storage medium of claim 22, wherein the operations further comprise:
sending a second statement to an execution node for executing the operation to update the set of values corresponding to the key; and
performing, by the execution node, the operation to update the set of values corresponding to the key.

24. The non-transitory computer-storage medium of claim 17, wherein the metadata database stores a table of schema version values corresponding to different schema versions, and a particular schema hash value corresponding to each schema version value from the schema version values, each particular schema hash value being different than other schema hash values.

* * * * *